(12) United States Patent
Park et al.

(10) Patent No.: US 9,594,440 B2
(45) Date of Patent: Mar. 14, 2017

(54) TOUCH SENSING SYSTEM AND METHOD FOR DRIVING THE SAME

(71) Applicant: LG DISPLAY CO., LTD., Seoul (KR)

(72) Inventors: Dongjo Park, Seoul (KR); Sojung Jung, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 175 days.

(21) Appl. No.: 14/496,921

(22) Filed: Sep. 25, 2014

(65) Prior Publication Data

US 2015/0091856 A1  Apr. 2, 2015

(30) Foreign Application Priority Data

Sep. 27, 2013  (KR) .................. 10-2013-0115305

(51) Int. Cl.
| | |
|---|---|
| G06F 3/046 | (2006.01) |
| G06F 3/0354 | (2013.01) |
| G06F 3/044 | (2006.01) |
| G06F 3/041 | (2006.01) |

(52) U.S. Cl.
CPC .......... *G06F 3/03545* (2013.01); *G06F 3/044* (2013.01); *G06F 3/046* (2013.01); *G06F 3/0416* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 7,903,085 B2 | 3/2011 | Yamamoto et al. | |
| 2004/0189587 A1* | 9/2004 | Jung .................. | G02F 1/13338 345/102 |
| 2006/0262106 A1* | 11/2006 | Suk ........................ | G06F 1/1626 345/179 |
| 2008/0150918 A1* | 6/2008 | Hagen ..................... | G06F 3/046 345/179 |
| 2009/0078476 A1* | 3/2009 | Rimon ................ | G06F 3/03545 178/18.03 |
| 2013/0141084 A1* | 6/2013 | Hsieh ...................... | G06F 3/046 324/207.16 |
| 2013/0207925 A1* | 8/2013 | Ryshtun ................ | G06F 3/0416 345/174 |
| 2014/0028634 A1* | 1/2014 | Krah ....................... | G06F 3/041 345/179 |
| 2014/0104224 A1* | 4/2014 | Ih ............................ | G06F 3/044 345/174 |
| 2014/0253465 A1* | 9/2014 | Hicks ................... | G06F 3/03545 345/173 |
| 2014/0253522 A1* | 9/2014 | Cueto ................. | G06F 3/03545 345/179 |

* cited by examiner

*Primary Examiner* — Kumar Patel
*Assistant Examiner* — Amy C Onyekaba
(74) *Attorney, Agent, or Firm* — Brinks Gilson & Lione

(57) ABSTRACT

A touch sensing system includes a pen including at least one resonant circuit embedded therein, XY electrodes including X electrodes and Y electrodes perpendicular to the X electrodes, an antenna surrounding the XY electrodes, and a first touch driving circuit which supplies a resonant inductive signal to the XY electrodes, decides a location of the pen based on a resonance magnitude of a resonance signal received through the antenna, and decides a pen pressure of the pen based on a resonant frequency of the resonant circuit and an adjacent frequency of the resonant frequency measured while varying a frequency of the resonant inductive signal.

18 Claims, 24 Drawing Sheets

(A)

(B)

TOUCH SENSING SYSTEM AND METHOD FOR DRIVING THE SAME

This application claims the benefit of priority to Korean Patent Application No. 10-2013-00115305 filed on Sep. 27, 2013, the entire contents of which is incorporated herein by reference for all purposes as if fully set forth herein.

BACKGROUND

Field of the Disclosure

Embodiments of the disclosure relate to a touch sensing system and a method for driving the same capable sensing a pen and a finger.

Discussion of the Related Art

A user interface (UI) is configured so that users are able to communicate with various electronic devices and thus can easily and comfortably control the electronic devices. Examples of the user interface include a keypad, a keyboard, a mouse, an on-screen display (OSD), and a remote controller having an infrared communication function or a radio frequency (RF) communication function. User interface technology has continuously expanded to increase user's sensibility and handling convenience. The user interface has been recently developed to include touch UI, voice recognition UI, 3D UI, etc.

The touch UI has been indispensably used in portable information appliances and has been expanded to the use of home appliances. The touch UI senses a location of a finger or a pen touching a touch screen and generates location information.

The touch screen is classified into a touch screen sensing a conductor, for example, the finger, and a touch screen sensing the pen. An example of the latter pen touch screen is disclosed in U.S. Pat. No. 7,903,085 (Mar. 8, 2011) (hereinafter, referred to as "a related art pen touch sensing device"). The related art pen touch sensing device includes a special pen including a resonant circuit embedded therein, a loop antenna receiving a resonance signal from the special pen, and an analog signal processing unit extracting location information and pen pressure information of the special pen from a signal of the loop antenna.

As shown in FIG. 1, in the related art pen touch sensing device, a square wave signal for inducing a resonance circuit of a pen PEN is propagated through an electromagnetic resonance path, i.e., the electromagnetic field, to an antenna ANT and is transmitted to the pen PEN. A resonance signal generated from a resonant circuit of the pen PEN is propagated through the electromagnetic resonance path and is received by the antenna ANT. The resonant circuit of the pen PEN is resonated by the square wave signal received through an electromagnetic resonance, i.e., the electromagnetic field and transmits the resonance signal to the loop antenna in the electromagnetic field. Thus, in the related art pen touch sensing device, the pen PEN and the antenna ANT transmit and receive the resonance signal in the electromagnetic field.

The related art pen touch sensing device inputs the resonance signal received through the loop antenna to an analog circuit. The analog circuit includes a location decision circuit deciding a location of the pen based on a phase of the resonance signal received through the loop antenna and a pen pressure decision circuit deciding a pen pressure of the pen based on the phase of the resonance signal.

The related art pen touch sensing device, however, has the following disadvantages.

The related art pen touch sensing device requires the plurality of loop antennas and switch circuits for sequentially driving the loop antennas, so as to detect a touch location of the pen in an XY coordinate system. The loop antennas have to be implemented in an overlapped shape in a matrix form, so as to recognize a touch point in the XY coordinate system. Further, because a separate antenna layer has to be added to a display panel so as to implement the loop antennas in the display panel, the thickness of the display panel increases. Because a structure for connecting the plurality of loop antennas and the analog signal processing unit to the display panel has to be added, a cable connection equipment becomes large and complicated. Thus, when the plurality of loop antennas are integrated in the display panel, it is difficult to provide a slim and simple display device.

Because the related art pen touch sensing device compares received signals of the pen using an analog comparator, only the presence or absence of the pen may be recognized and it is difficult to accurately represent coordinates of the touch location of the pen.

Because the related art pen touch sensing device additionally includes the location decision circuit and the pen pressure decision circuit, the circuit complexity increases and also an amount of operations increases. Hence, power consumption increases.

Because the phase of the resonance signal in the related art pen touch sensing device sensitively varies depending on a surrounding environment, it is difficult to accurately detect the phase of the resonance signal due to parasitic capacitances of the loop antenna.

The related art pen touch sensing device calculates an arctangent value of the resonance signal and measures the pen pressure. As shown in FIG. 2 showing an arctangent characteristic curve, a nonlinear period is formed at "−pi" and "+pi". This is because the arctangent value is initialized every $2\pi$ (360°). Because of this, change in the arctangent value depending on a phase difference of the resonance signal is discontinued at predetermined time intervals. Thus, the related art pen touch sensing device has to set a range of a resonant frequency except the nonlinear period.

Because a pulse generator used in the related art pen touch sensing device limits a frequency region of the resonance signal, it is difficult to change the resonant frequency.

Because the analog signal processing unit used in the related art pen touch sensing device shows different operation results depending on the surrounding environment, such as a temperature and humidity, its reliability is low.

SUMMARY

In one aspect, a touch sensing system comprises a pen including at least one resonant circuit embedded therein, XY electrodes including X electrodes and Y electrodes perpendicular to the X electrodes, an antenna configured to surround the XY electrodes, and a first touch driving circuit configured to supply a resonant inductive signal to the XY electrodes, decide a location of the pen based on a resonance magnitude of a resonance signal received through the antenna, and decide a pen pressure of the pen based on a resonant frequency of the resonant circuit and an adjacent frequency of the resonant frequency measured while varying a frequency of the resonant inductive signal.

In another aspect, a method for driving a touch sensing system including a pen including a resonant circuit embedded therein, XY electrodes including X electrodes and Y electrodes perpendicular to the X electrodes, and an antenna surrounding the XY electrodes, wherein the method comprises deciding a location of the pen based on a resonance magnitude of a resonance signal received through the antenna, and deciding a pen pressure of the pen based on a resonant frequency of the resonant circuit and an adjacent frequency of the resonant frequency measured while varying a frequency of a resonant inductive signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
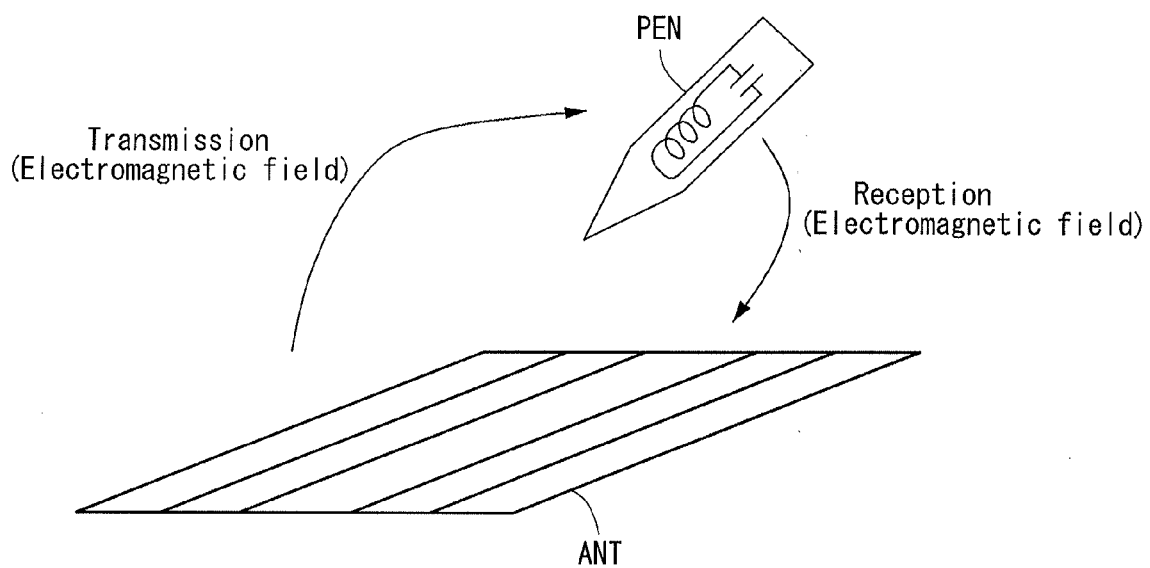
FIG. 1 shows the transmission and the reception of a resonance signal in a related art pen touch sensing device.
Figure 2:
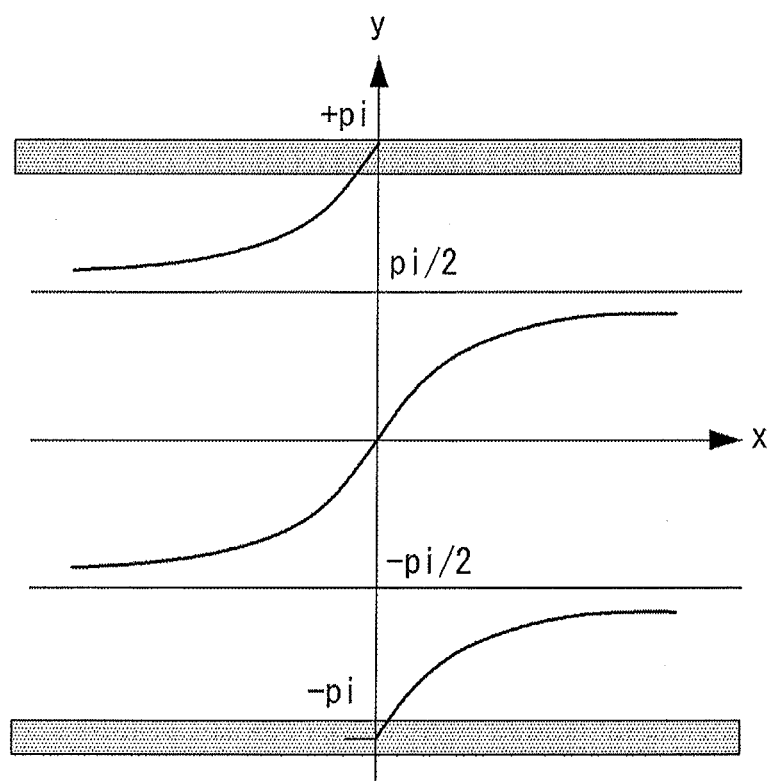
FIG. 2 shows an arctangent characteristic curve.
Figure 3:
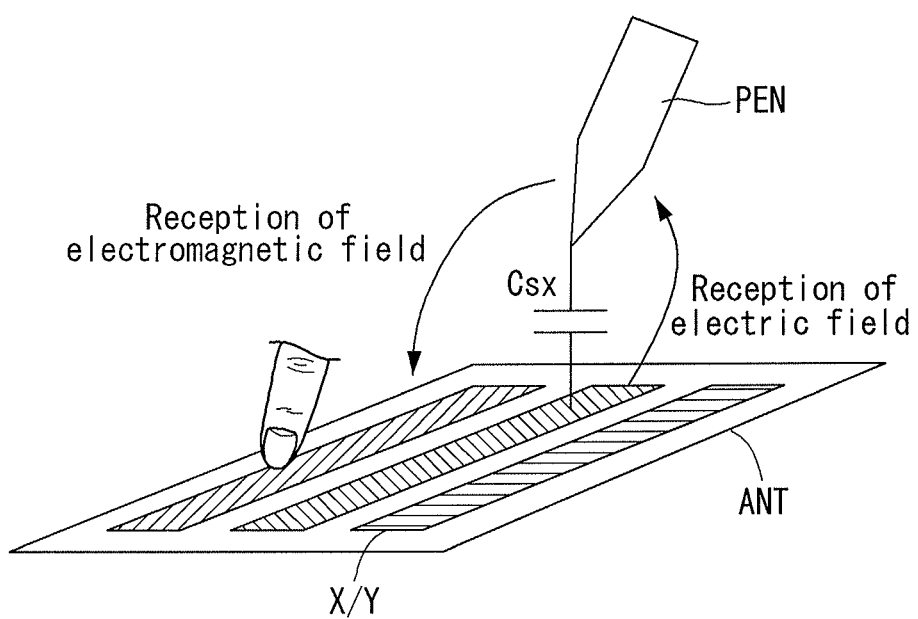
FIG. 3 shows the transmission of an electric field and the reception of a resonance signal in a touch sensing system according to an exemplary embodiment of the invention.
Figure 4:
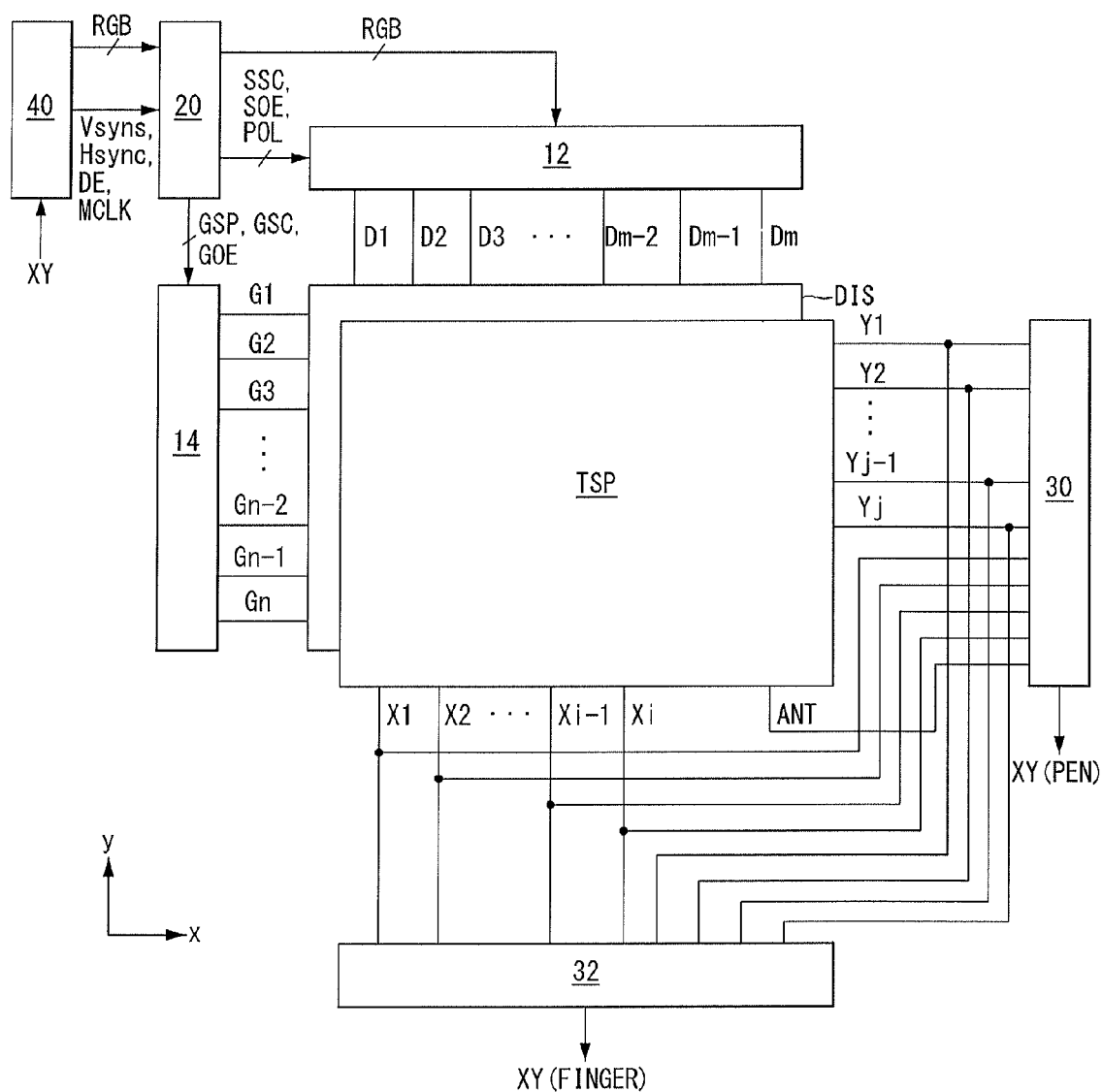
FIG. 4 is a block diagram of a touch sensing system according to an exemplary embodiment of the invention.

As shown in FIG. 3, a touch sensing system according to an exemplary embodiment of the invention includes a plurality of XY electrodes X/Y, an antenna ANT, and a pen PEN.

The XY electrodes X/Y are divided into an X electrode group and a Y electrode group. The X electrode group includes a plurality of X electrodes. The Y electrode group includes a plurality of Y electrodes perpendicular to the X electrodes with a dielectric interposed therebetween. The XY electrodes X/Y substantially have the same structure as electrodes in an existing capacitive touch screen. Thus, the embodiment of the invention may implement the XY electrodes X/Y as electrodes of a touch screen for an existing finger touch sensing operation.

The XY electrodes X/Y overlap a pixel array of a display panel, on which an input image is displayed. Thus, the XY electrodes X/Y may be formed of a material with a high transmittance, for example, indium tin oxide (ITO). The XY electrodes X/Y are electrically coupled with the pen PEN through a capacitance Csx. The capacitance Cx is a capacitance formed between the XY electrodes X/Y and the pen PEN. An electrical coupling is generated between the XY electrodes X/Y and the pen PEN through the capacitance Cx. The XY electrodes X/Y transmit a resonant inductive signal of an electric field to the pen PEN through the capacitance Csx.

The pen PEN includes a resonant circuit. The resonant circuit of the pen PEN resonates in response to the resonant inductive signal received through the parasitic capacitance Csx and generates a resonance signal. When a tip of the pen PEN is pressed on the touch screen, an inductance (L) value and a capacitance (C) value in the resonant circuit of the pen PEN change. Hence, a resonant frequency of the resonant circuit changes. Thus, changes in a pen pressure of the pen PEN result in changes in the resonant frequency. The resonance signal from the pen PEN is transmitted to the antenna ANT through an electromagnetic resonance path.

The antenna ANT receives the resonance signal of the pen PEN. The antenna ANT may be implemented as a single loop antenna surrounding the XY electrodes X/Y. The touch sensing system according to the embodiment of the invention senses a touch input of a finger based on changes in the capacitance Csx through the XY electrodes X/Y and senses a touch input of the pen PEN using the XY electrodes X/Y and the antenna ANT.

The touch sensing system according to the embodiment of the invention may be coupled with various types of display devices. The display device may be implemented based on a flat panel display, such as a liquid crystal display (LCD), a field emission display (FED), a plasma display panel (PDP), an organic light emitting display, and an electrophoresis display (EPD). In the following description, the embodiment of the invention will be described using the liquid crystal display as an example of the flat panel display. Other flat panel displays may be used.

As shown in FIGS. 4 to 7, the display device according to the embodiment of the invention includes a display panel DIS, a display driving circuit, a touch screen TSP, a touch screen driving circuit, etc.

The display panel DIS includes a liquid crystal layer formed between an upper substrate GLS1 and a lower substrate GLS2. A pixel array of the display panel DIS includes pixels formed in pixel areas defined by data lines D1 to Dm and gate lines (or scan lines) G1 to Gn, where m and n are a positive integer. Each pixel includes thin film transistors (TFTs) formed at crossings of the data lines D1 to Dm and the gate lines G1 to Gn, a pixel electrode charged to a data voltage, a storage capacitor which is connected to the pixel electrode and holds a voltage of a liquid crystal cell, etc.

Black matrixes, color filters, etc. are formed on the upper substrate GLS1 of the display panel DIS. The lower substrate GLS2 of the display panel DIS may be configured in a COT (color filter on TFT) structure. In this instance, the black matrixes and the color filters may be formed on the lower substrate GLS2 of the display panel DIS. Common electrodes, to which a common voltage Vcom is supplied, may be formed on the upper substrate GLS1 or the lower substrate GLS2 of the display panel DIS. Polarizing plates are respectively attached to the upper substrate GLS1 and the lower substrate GLS2 of the display panel DIS. Alignment layers for setting a pre-tilt angle of liquid crystals are respectively formed on the inner surfaces contacting the liquid crystals in the upper substrate GLS1 and the lower substrate GLS2 of the display panel DIS. A column spacer is formed between the upper substrate GLS1 and the lower substrate GLS2 of the display panel DIS to keep a cell gap of the liquid crystal cells constant.

A backlight unit may be disposed under a back surface of the display panel DIS. The backlight unit may be implemented, for example, as one of an edge type backlight unit and a direct type backlight unit and irradiates light onto the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 12, a scan driving circuit 14, and a timing controller 20. The display driving circuit applies a video data voltage of an input image to the pixels of the display panel DIS. The data driving circuit 12 converts digital video data RGB of the input image received from the timing controller 20 into positive and negative analog gamma compensation voltages and outputs the data voltage. The data driving circuit 12 then supplies the data voltage to the data lines D1 to Dm. The scan driving circuit 14 sequentially supplies a gate pulse (or scan pulse) synchronized with the data voltage to the gate lines G1 to Gn and selects lines of the display panel DIS, to which the data voltage is applied.

The timing controller 20 receives timing signals, such as a vertical sync signal Vsync, a horizontal sync signal Hsync, a data enable signal DE, and a main clock MCLK, from a host system 40. The timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, etc.

The timing controller 20 multiplies a frame rate of the input image by 'N' to obtain a frequency of (frame rate×N) Hz, where N is a positive integer equal to or greater than 2. Hence, the timing controller 20 may control an operation frequency of each of the display driving circuit and the touch screen driving circuit based on the frequency of (frame rate×N) Hz. The frame rate of the input image is 60 Hz (one frame period=16.67 msec) in a national television standards committee (NTSC) scheme and is 50 Hz (one frame period=20 msec) in a phase alternate line (PAL) scheme.

Figure 8:
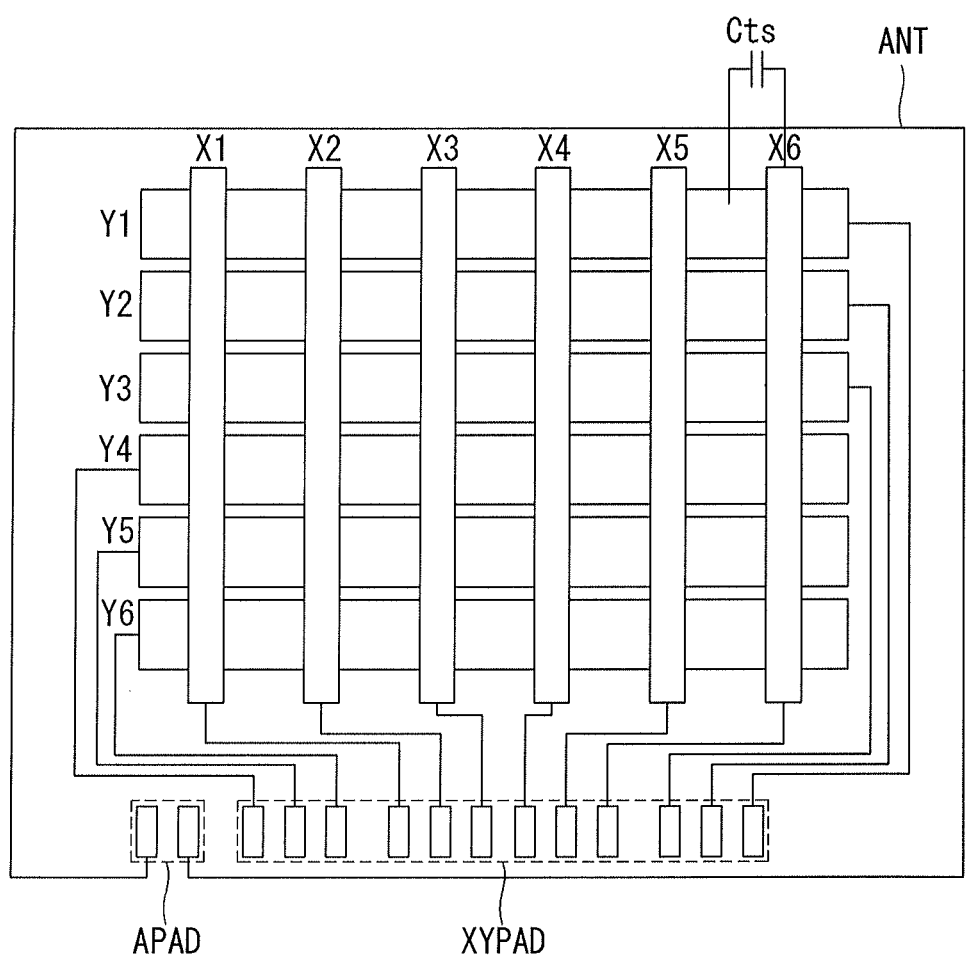
FIG. 8 is a plane view showing a structure of a touch screen according to an exemplary embodiment of the invention.

The touch screen TSP includes XY electrodes X1 to Xi and Y1 to Yj and the antenna ANT shown in FIGS. 3 and 8. Touch sensors Cts are formed at crossings of the XY electrodes X1 to Xi and Y1 to Yj, and a charge amount of the touch sensor Cts varies depending on the presence or absence of a conductor, for example, the finger. The XY electrodes X1 to Xi and Y1 to Yj may be implemented as electrodes used in the existing capacitive touch screen sensing a touch input of the finger. Thus, the touch screen TSP according to the embodiment of the invention may be simply implemented by additionally installing the antenna ANT at an edge of the existing capacitive touch screen.

Figure 5:
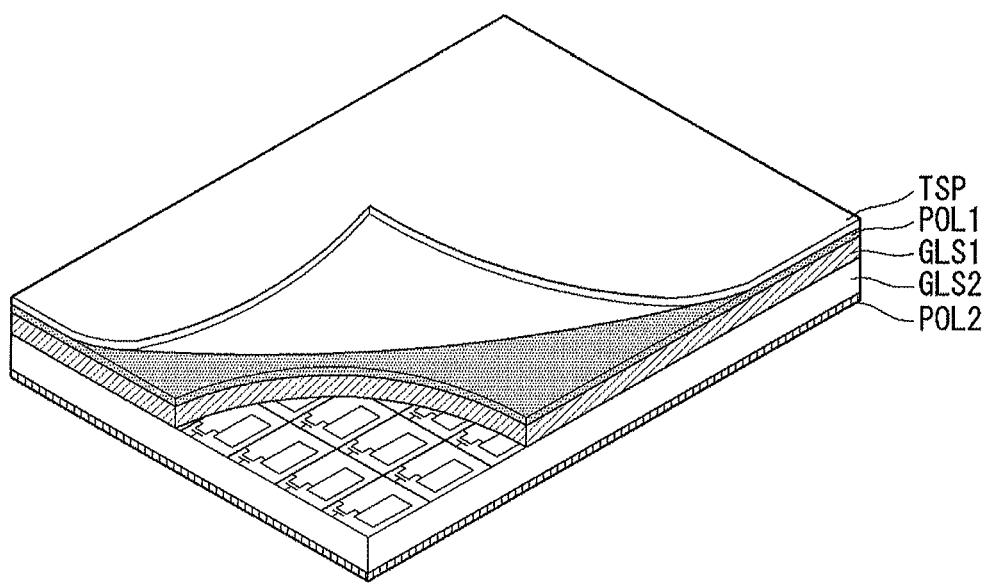
FIGS. 5 to 7 illustrate various combinations of a touch screen and a display panel according to an exemplary embodiment of the invention.
Figure 6:
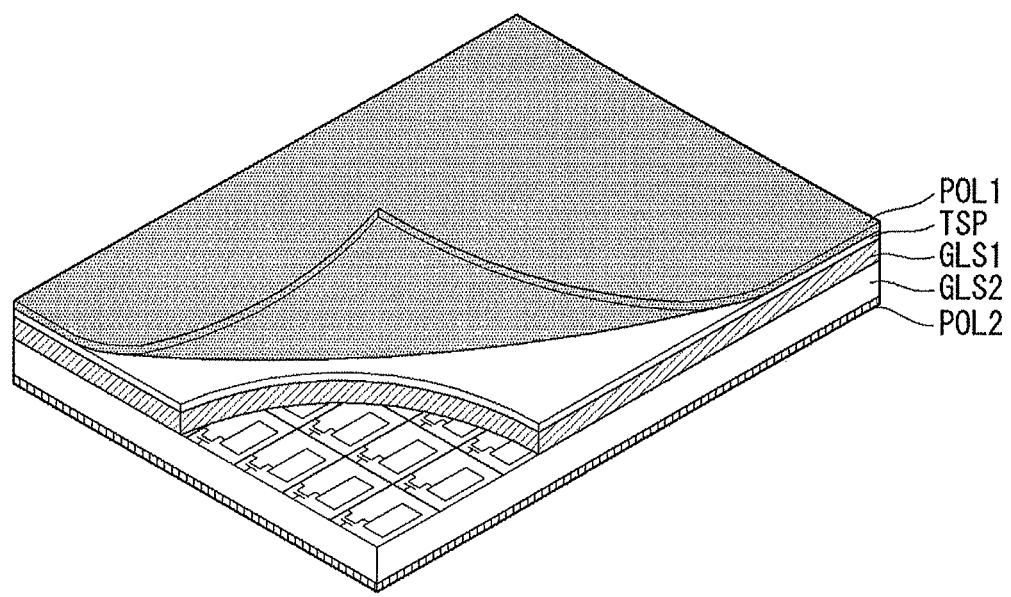
Figure 7:
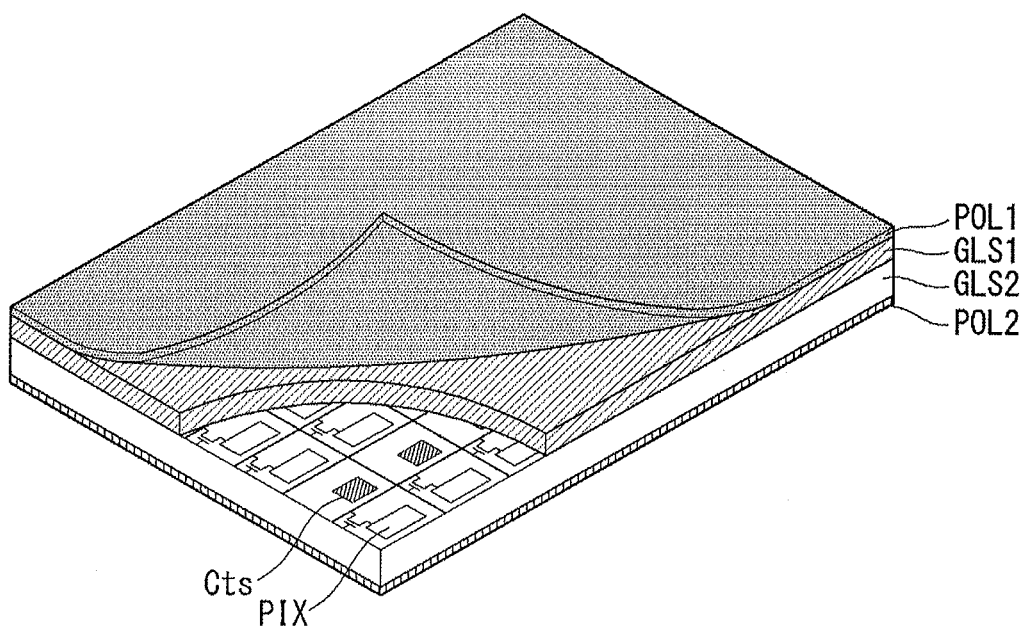

As shown in FIG. 5, the XY electrodes X1 to Xi and Y1 to Yj and the antenna ANT of the touch screen TSP may be attached on an upper polarizing plate POL1 of the display panel DIS. Alternatively, as shown in FIG. 6, the XY electrodes X1 to Xi and Y1 to Yj and the antenna ANT of the touch screen TSP may be formed between the upper polarizing plate POL1 and the upper substrate GLS1 of the display panel DIS. Alternatively, as shown in FIG. 7, the XY electrodes X1 to Xi and Y1 to Yj and the antenna ANT of the touch screen TSP may be embedded in the lower substrate GLS2 of the display panel DIS along with the pixel array of the display panel DIS in an in-cell type. In FIGS. 5 to 7, 'PIX' denotes the pixel electrode of the liquid crystal cell, and 'POL2' denotes a lower polarizing plate of the display panel DIS. The XY electrodes X1 to Xi and Y1 to Yj and the antenna ANT of the touch screen TSP may be formed on the same plane or different planes.

The touch screen driving circuit includes a first touch driving circuit 30 and a second touch driving circuit 32.

The first touch driving circuit 30 sequentially supplies the resonant inductive signal to the XY electrodes X1 to Xi and Y1 to Yj and receives the resonance signal of the pen PEN through the antenna ANT. The first touch driving circuit 30 converts the resonance signal of the pen PEN received through the antenna ANT into digital data and measures a resonance magnitude at each resonant frequency. The first touch driving circuit 30 compares the resonance magnitude of the resonance signal with a predetermined reference value and decides touch location information XY of the pen PEN. Further, the first touch driving circuit 30 measures a pen pressure of the pen PEN based on frequency characteristic of the resonance signal. Location and pen pressure information XY(PEN) of the pen PEN generated by the first touch driving circuit 30 is transmitted to the host system 40.

The second touch driving circuit 32 senses a touch location of the finger based on changes in the capacitance before and after a touch operation of the touch sensors Cts. The capacitance may be divided into a self capacitance and a mutual capacitance. The second touch driving circuit 32 sequentially supplies a stimulus signal to the X electrodes or the XY electrodes X1 to Xi and Y1 to Yj, detects the changes in the capacitance before and after the touch operation of the touch sensors Cts in synchronization with the stimulus signal, and converts the changes in the capacitance into digital data. The second touch driving circuit 32 compares the digital data with a predetermined reference value and determines touch location information XY(FINGER) of the finger. The touch location information XY(FINGER) of the finger generated by the second touch driving circuit 32 is transmitted to the host system 40. The stimulus signal may be generated as an AC signal of various shapes, such as a pulse and a triangle wave. The second touch driving circuit 32 may be implemented as a touch driving circuit used in the existing capacitive touch screen sensing the finger touch input.

The host system 40 may be implemented, for example, as one of a television system, a set-top box, a navigation system, a DVD player, a Blu-ray player, a personal computer (PC), a home theater system, and a phone system and receives the input image. The host system 40 receives the location and pen pressure information XY(PEN) of the pen PEN from the first touch driving circuit 30 and receives the touch location information XY(FINGER) of the finger from the second touch driving circuit 32.

The host system 40 includes a system on chip (SoC), in which a scaler is embedded, and converts the digital video data RGB of the input image into a data format suitable for displaying on the display panel DIS. The host system 40 transmits the digital video data RGB of the input image and the timing signals Vsync, Hsync, DE, and MCLK to the timing controller 20. Further, the host system 40 runs an application program associated with the location and pen pressure information XY(PEN) of the pen PEN and the touch location information XY(FINGER) of the finger received from the first and second touch driving circuits 30 and 32.

FIG. 8 is a plane view showing the XY electrodes and the antenna of the touch screen according to the embodiment of the invention.

As shown in FIG. 8, the XY electrodes include X electrodes X1 to X6 arranged in parallel along an x-axis and Y electrodes Y1 to Y6, which are arranged in parallel along a y-axis and are perpendicular to the X electrodes X1 to X6. The antenna ANT may be implemented as a single antenna surrounding the XY electrodes X1 to X6 and Y1 to Y6. The single antenna may be formed in a bezel area outside the pixel array, on which an image is displayed, so that an aperture ratio of the pixels is not reduced. The first touch driving circuit 30 is connected to the antenna ANT through antenna pads APAD and is connected to the XY electrodes X1 to X6 and Y1 to Y6 through XY pads XYPAD.

Figure 9:
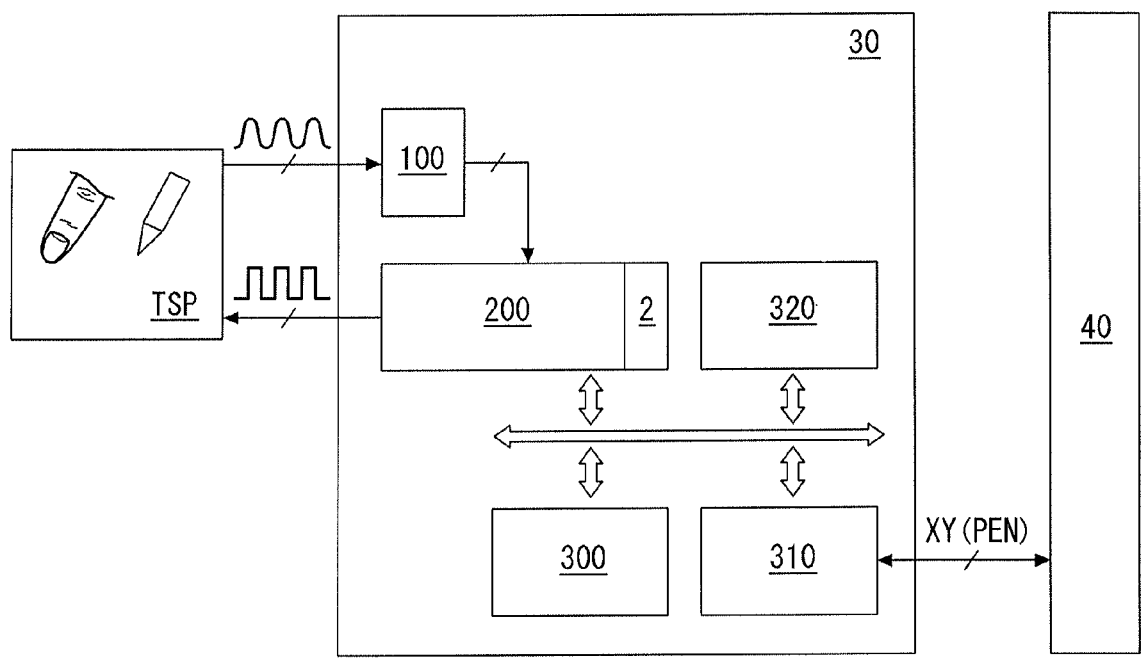
FIG. 9 shows an example where a first touch driving circuit is integrated into one chip integrated circuit (IC)

FIG. 9 shows an example where the first touch driving circuit 30 is integrated into one chip integrated circuit (IC).

As shown in FIG. 9, one chip IC includes an analog signal processing unit 100, a digital signal processing unit 200, a microprocessor unit (MPU) 300, an interface circuit 310, and a memory 320.

The digital signal processing unit 200 includes a memory 2. The memory 2 stores resonant characteristic of the resonance signal at each resonant frequency, temporarily stores previous data so as to accumulate data in integrators 214 and 216 shown in FIG. 13, and temporarily stores output data of a location and pen pressure decision unit 218 shown in FIG. 13.

The microprocessor unit 300 stores the location and pen pressure information XY(PEN) of the pen PEN received from the location and pen pressure decision unit 218 in the memory 320. The microprocessor unit 300 interpolates coordinate information of the touch location of the pen PEN, so as to change a resolution of the touch screen TSP in conformity with a resolution of the display panel DIS. The microprocessor unit 300 may perform an additional algorithm for removing a noise and improving a touch recognition performance. The interface circuit 310 transmits the location and pen pressure information XY(PEN) of the pen PEN to the host system 40 through a standard interface.

Figure 10:
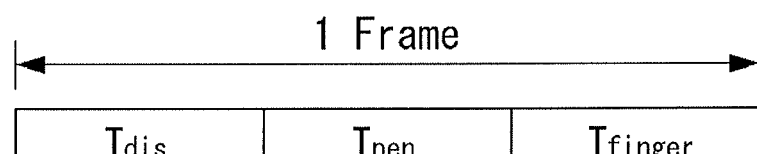
FIG. 10 shows one frame period according to an exemplary embodiment of the invention.
Figure 10:
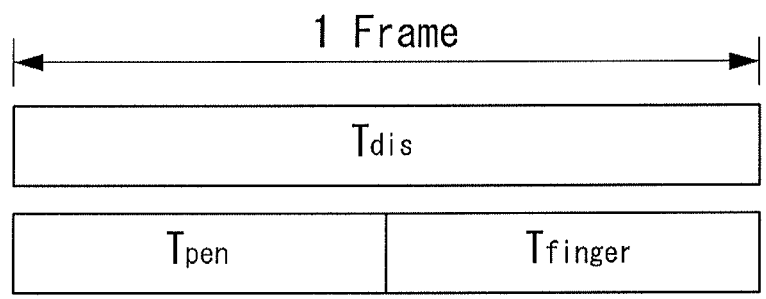

FIG. 10 shows one frame period according to the embodiment of the invention.

When the touch screen TSP is embedded in the pixel array of the display panel DIS as shown in FIG. 7, electrical coupling is generated between the pixel array and the touch screen TSP and may adversely affect the pixel array and the touch screen TSP. Thus, as shown in (A) of FIG. 10, when the touch screen TSP is embedded in the pixel array of the display panel DIS, one frame period may be time-divided into a display period Tdis, a first touch sensing period Tpen, and a second touch sensing period Tfinger.

When the touch screen TSP is embedded in the pixel array of the display panel DIS, the XY electrodes of the touch screen TSP may serve as the common electrodes supplying the common voltage Vcom to the pixels. In this instance, the common voltage Vcom is supplied to the XY electrodes during the display period Tdis, and the stimulus signal or the resonant inductive signal is supplied to the XY electrodes during the first and second touch sensing periods Tpen and Tfinger.

When the touch screen TSP is embedded in the pixel array of the display panel DIS of the organic light emitting display as the display device, a pixel power voltage including a high potential power voltage VDD, a low potential power voltage VSS, a reference voltage, etc. may be supplied to the XY electrodes of the touch screen TSP during the display period Tdis.

During the display period Tdis, the display driving circuit is driven and applies the digital video data of the input image to the pixels of the display panel DIS. During the first touch sensing period Tpen, the first touch driving circuit 30 is driven and senses the touch location and the pen pressure of the pen on the touch screen TSP. During the second touch sensing period Tfinger, the second touch driving circuit 32 is driven and senses the touch location of the conductor, for example, the finger on the touch screen TSP.

When the touch screen TSP is formed on the upper substrate GLS1 separated from the pixel array of the display panel DIS as shown in FIGS. 5 and 6, there is almost no electrical coupling between the pixel array and the touch screen TSP. Thus, as shown in (B) of FIG. 10, when the touch screen TSP is separated from the pixel array of the display panel DIS, one frame period may be assigned as the display period Tdis. Further, one frame period may be divided into the first and second touch sensing periods Tpen and Tfinger. In this instance, the display period Tdis may overlap the first and second touch sensing periods Tpen and Tfinger.

Figure 11:
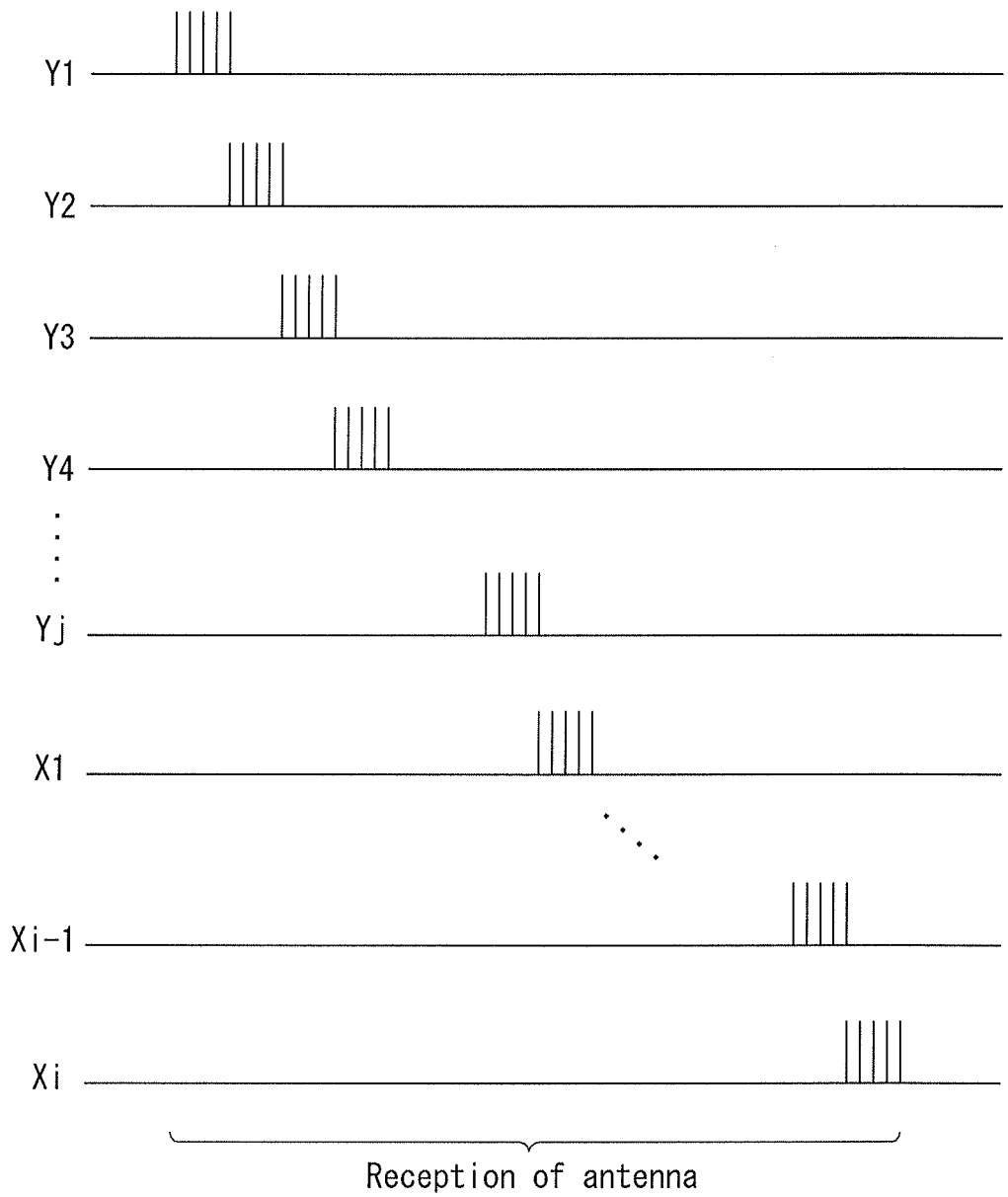
FIG. 11 is a waveform diagram showing a touch sensing operation of a pen.

FIG. 11 is a waveform diagram showing a touch sensing operation of the pen.

As shown in FIG. 11, the first touch driving circuit 30 operates in the first touch sensing period Tpen and sequentially supplies the resonant inductive signal to the XY electrodes Y1 to Yj and X1 to Xi, thereby inducing a resonance of the pen PEN. The resonant circuit of the pen PEN resonates in response to the resonant inductive signal input as the electric field through the capacitance Csx and generates the resonance signal. The antenna ANT receives the resonance signal from the pen PEN in the electromagnetic field. The first touch driving circuit 30 converts an analog resonance signal received through the antenna ANT into digital data and calculates an amplitude and a phase of the resonance signal in the digital data, thereby sensing the location and the pen pressure of the pen PEN.

Figure 12:
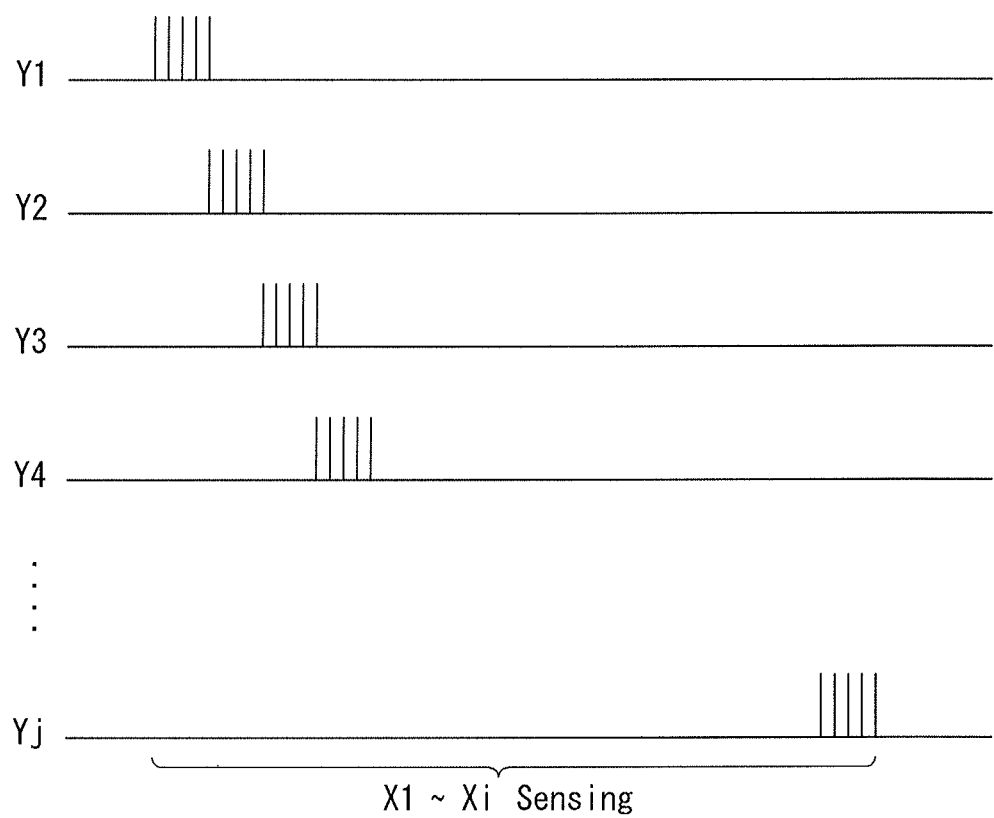
FIG. 12 is a waveform diagram showing a touch sensing operation of a finger.

FIG. 12 is a waveform diagram showing a touch sensing operation of the finger.

As shown in FIG. 12, the second touch driving circuit 32 operates in the second touch sensing period Tfinger. In the mutual capacitance, the second touch driving circuit 32 sequentially supplies the stimulus signal to the Y electrodes Y1 to Yj and receives charges of the touch sensors Cts through the X electrodes X1 to Xi in synchronization with the stimulus signal. When the touch sensors Cts are touched with the finger, the second touch driving circuit 32 senses the touch input based on a change amount of charges of the touch sensors Cts before and after the touch operation. Thus, during the second touch sensing period Tfinger, the Y electrodes Y1 to Yj belonging to the Y electrode group operate as Tx channel electrodes supplying the stimulus signal to the touch sensors Cts, and the X electrodes X1 to Xi belonging to the X electrode group operate as Rx channel electrodes receiving the charges from the touch sensors Cts.

In the self capacitance, the second touch driving circuit 32 sequentially supplies the stimulus signal to the X electrodes X1 to Xi and the Y electrodes Y1 to Yj. In the self capacitance, the second touch driving circuit 32 senses the touch input through the X electrodes X1 to Xi and the Y electrodes Y1 to Yj based on changes in a falling edge time or a rising edge time of the stimulus signal before and after the touch operation. Thus, during the second touch sensing period Tfinger, the X electrodes X1 to Xi and the Y electrodes Y1 to Yj operate as the Tx channel electrodes and the Rx channel electrodes, respectively.

Figure 13:
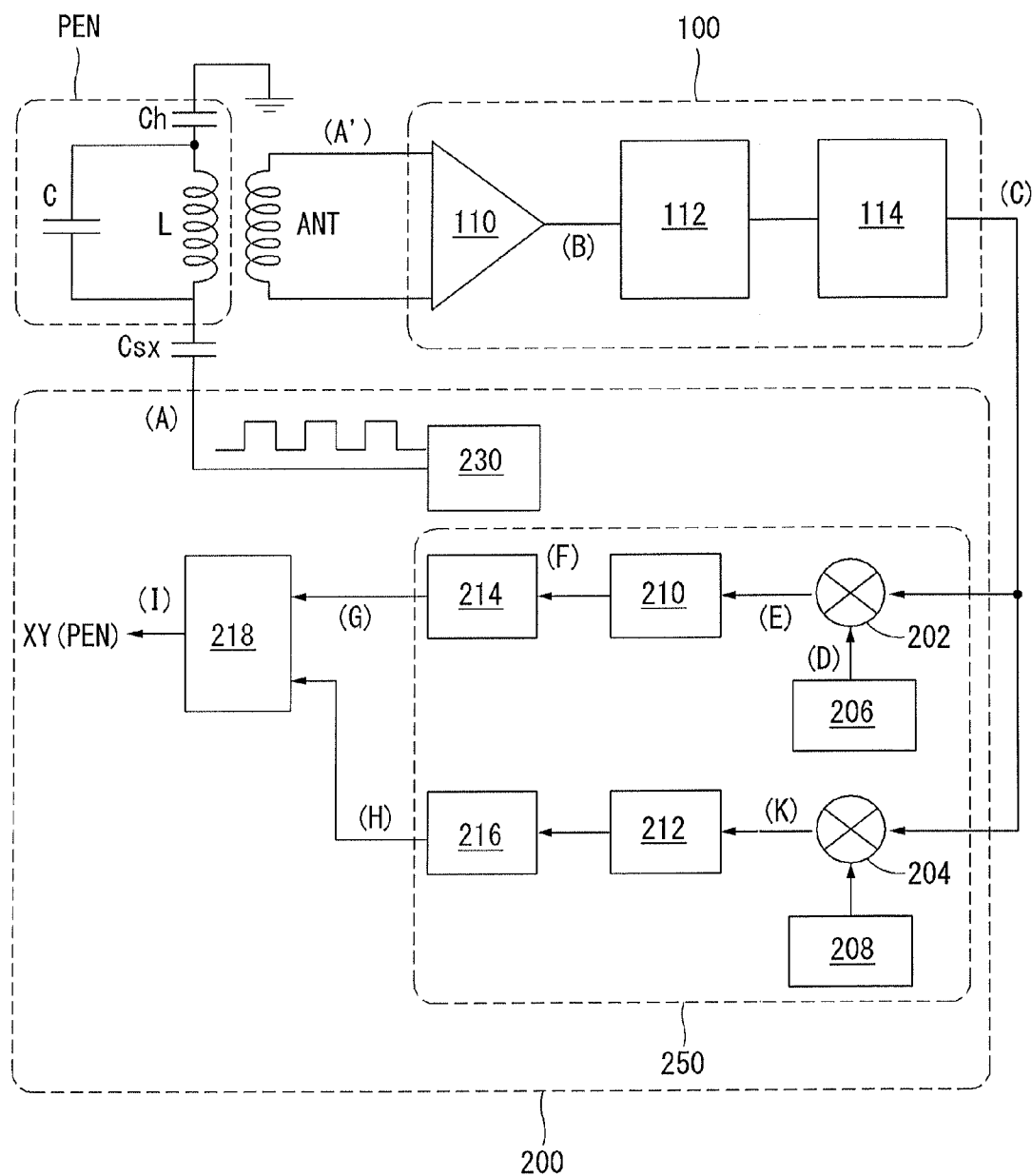
FIG. 13 is a circuit diagram showing in detail a first touch driving circuit according to an exemplary embodiment of the invention.
Figure 14:
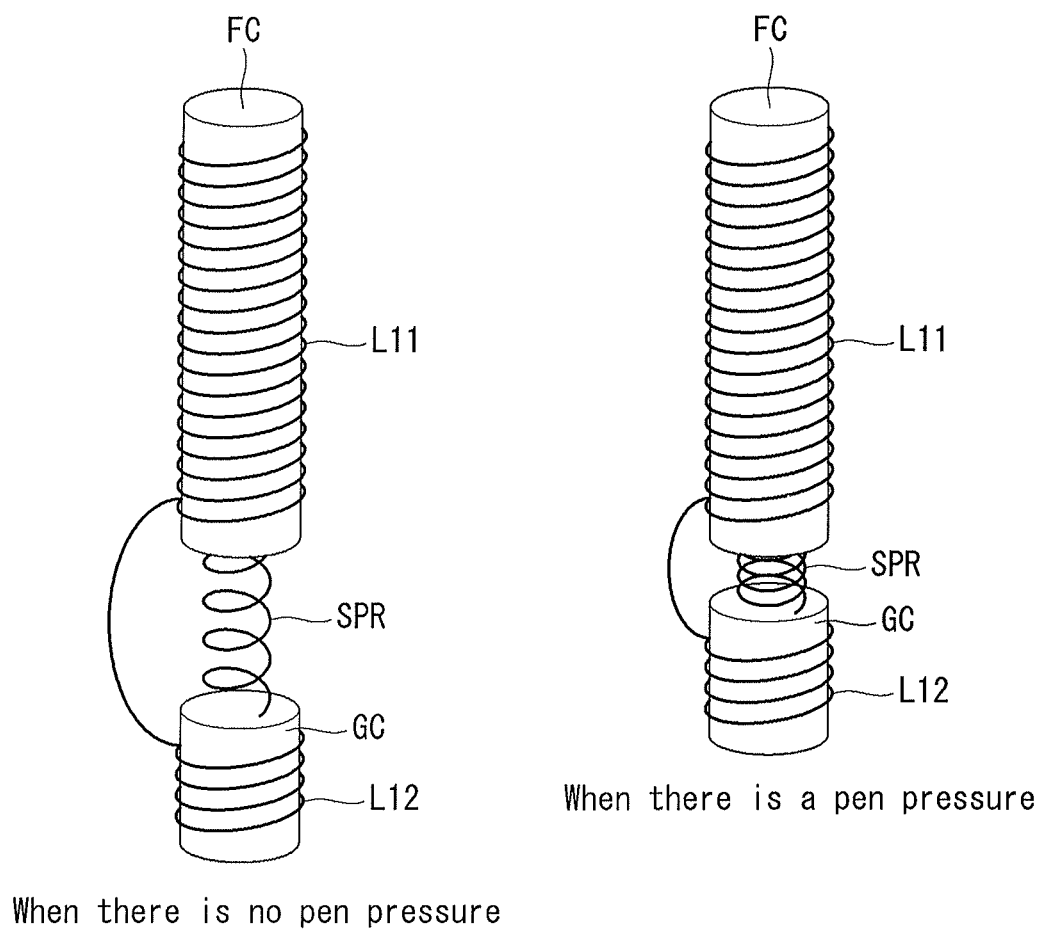
FIG. 14 shows an inductor embedded in a pen.
Figure 15:
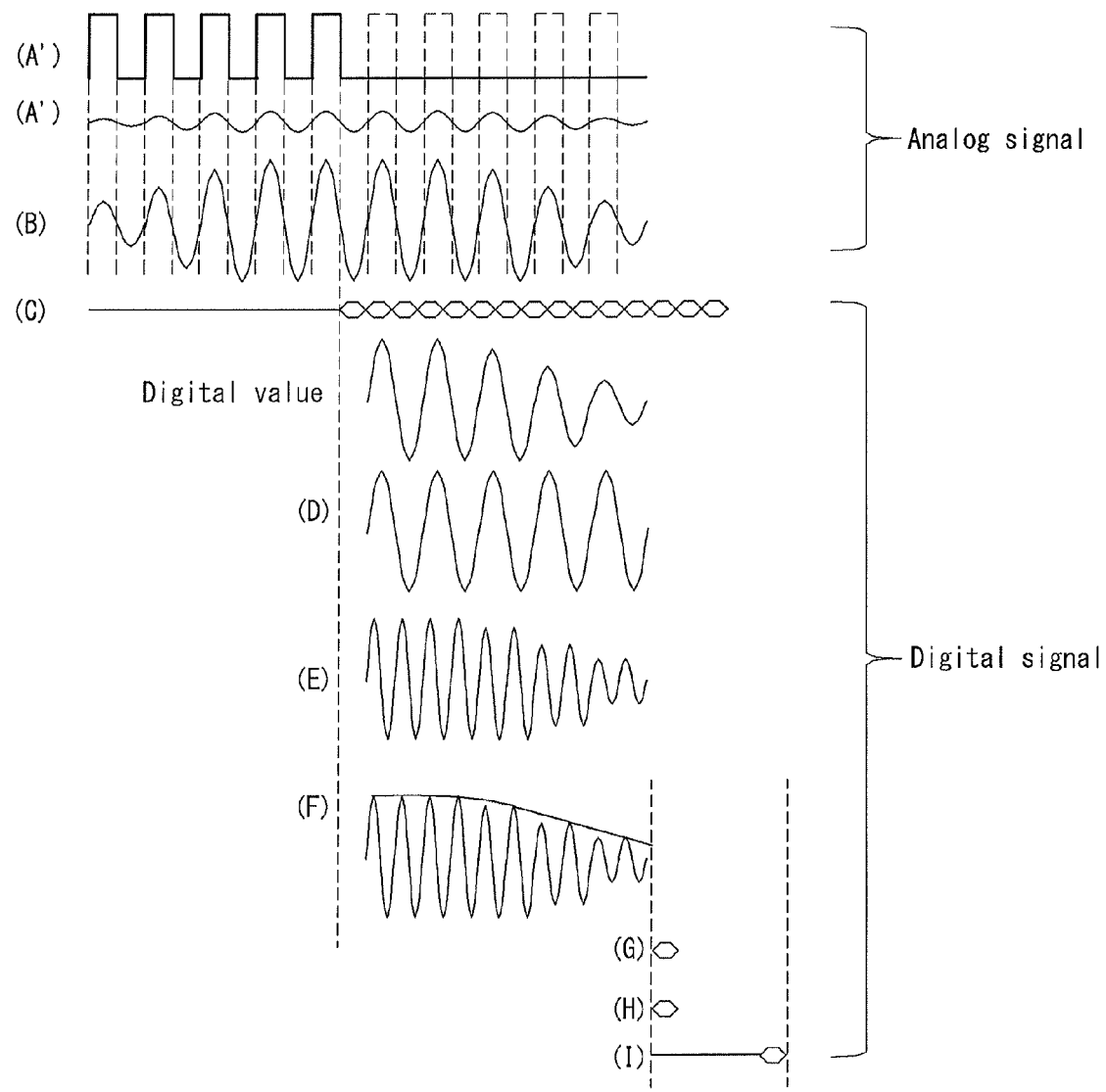
FIG. 15 is a waveform diagram showing an operation of a first touch driving circuit.

FIG. 13 is a circuit diagram showing in detail the first touch driving circuit 30. FIG. 14 shows an inductor embedded in the pen. FIG. 15 is a waveform diagram showing an operation of the first touch driving circuit 30.

As shown in FIGS. 13 to 15, the first touch driving circuit 30 includes the analog signal processing unit 100 and the digital signal processing unit 200.

The pen PEN includes an LC parallel resonant circuit, in which an inductor L and a capacitor C are connected in parallel. When the tip of the pen PEN is pressed on the touch screen, an inductance value and a capacitance value in the resonant circuit of the pen PEN change. Hence, a resonant frequency of the resonant circuit changes. In FIG. 13, 'Ch' connected to the pen PEN denotes a parasitic capacitance generated when the human holds the pen PEN. When a frequency of the resonant inductive signal applied to the pen PEN through the capacitance Csx is equal to the resonant frequency of the LC parallel resonant circuit, the pen PEN generates the resonance signal. Thus, the pen PEN does not require separate electric power connected to the LC parallel resonant circuit. The resonant inductive signal applied to the pen PEN is generated in the digital signal processing unit 200. The resonant inductive signal may be generated in the digital signal processing unit 200 in various types including a square wave signal, a sine wave signal, etc. The resonance signal of the pen PEN is received by the antenna ANT.

The inductance in the LC parallel resonant circuit of the pen PEN varies depending on the pen pressure. For this, the inductor L may be implemented as shown in FIG. 14. A coil L11 wound on a ferrite core FC and a coil L12 wound on a guide core GC are connected in series to each other. A spring SPR is installed between the ferrite core FC and the guide core GC. According to an equation of "$L=\mu SN^2/l$", the inductance is proportional to magnetic permeability μ, cross-sectional area S of the coil, and the square of N turns and is inversely proportional to length (l) of the coil. Thus, when the pen PEN is pressed on the touch screen TSP and the pen pressure of the pen PEN is generated, a distance between the ferrite core FC and the guide core GC decreases as the spring SPR is compressed. In other words, when the pen pressure of the pen PEN is generated, magnetic permeability μ increases and length (l) of the coil decreases. Hence, the inductance L increases. When the inductance L in the LC parallel resonant circuit increases, the resonant frequency decreases. The embodiment of the invention may decide the pen pressure using the resonant frequency changing when the pen pressure is generated.

In FIGS. 13 and 15, (A) shows an example of a resonant inductive signal of a square wave of the electric field applied to the pen PEN through the capacitance Csx. (A') is an analog signal measured in the antenna ANT when the antenna ANT receives the resonance signal generated from the pen PEN in response to the resonant inductive signal (A) of the square wave. The resonance signal generated in the pen PEN may be represented by $V=V_0 \cdot e^{-t/\tau} \cdot \cos(\omega t+\phi)$. A resonant frequency ω may change depending on the pen pressure of the pen PEN.

The analog signal processing unit 100 amplifies the analog resonance signal received through the antenna ANT and extracts a frequency band of the resonance signal of the pen PEN, thereby outputting a digital resonance signal. For this, the analog signal processing unit 100 includes an amplifier 110, a band pass filter (BPF) 112, and an analog-to-digital converter (ADC) 114.

The amplifier 110 amplifies an antenna signal by its gain and transmits the antenna signal to the BPF 112. In FIGS. 13 and 15, (B) is the antenna signal amplified by the amplifier 110. The BPF 112 cuts off a frequency band except the resonant frequency of the LC parallel resonant circuit, removes a noise from the antenna signal, and extracts the resonance signal. The ADC 114 quantizes the resonance signal input from the BPF 112 and outputs a digital resonance signal.

In FIGS. 13 and 15, (C) is the digital resonance signal output from the ADC 114 and may be represented by $S(t) \cdot \sin(wt+\phi)$, where S(t) is an amplitude of the resonance signal, ω is the resonant frequency, and φ is a phase.

When the resonance signal in the digital signal input from the analog signal processing unit 100 is represented by a complex number, the digital signal processing unit 200 extracts a real part and an imaginary part from the complex number and calculates the magnitude (i.e., the amplitude) of the resonance signal based on the real part and the imaginary part. The digital signal processing unit 200 compares the magnitude of the resonance signal with a predetermined reference value and decides whether or not the pen PEN is sensed on the touch screen TSP. At this time, the digital signal processing unit 200 calculates location coordinates of the pen PEN based on a location of the XY electrode, to which the resonance signal is applied. Further, the digital signal processing unit 200 decides the pen pressure of the pen PEN based on the changes in the frequency of the resonance signal of the pen PEN. For this, the digital signal processing unit 200 includes a Tx driver 230, a digital demodulator 250, and a location and pen pressure decision unit 218.

As shown in FIG. 11, the Tx driver 230 sequentially supplies the XY electrodes X1 to Xi and Y1 to Yj with a square wave signal having a frequency equal to the resonant frequency of the pen PEN as the resonant inductive signal. When it is decided that the pen PEN is positioned on the touch screen TSP based on an output (I) of the location and pen pressure decision unit 218, coordinate information of the pen PEN may be calculated based on coordinate information of the XY electrodes X1 to Xi and Y1 to Yj, to which the resonant inductive signal is applied.

The digital demodulator 250 extracts the real part and the imaginary part of the resonance signal from the digital resonance signal and adds a result of removing a high frequency noise from each of the real part and the imaginary part n times, where n is a positive integer equal to or greater than 2. The digital demodulator 250 supplies the addition result to the location and pen pressure decision unit 218. For this, the digital demodulator 250 includes first and second oscillators 206 and 208, first and second multipliers 202 and 204, first and second low pass filters (LPF) 210 and 212, and first and second integrators 214 and 216.

The first oscillator 206 inputs an oscillating signal (D), of which a frequency and a phase are the same as the resonance signal, to the first multiplier 202, so as to extract the real part of the resonance signal. In FIGS. 13 and 15, when (C) is represented by $S(t) \cdot \sin(wt+\phi)$, (D) may be represented by $\sin(wt)$.

The first multiplier 202 detects an envelope of the real part from the received resonance signal. The first multiplier 202 multiplies the received resonance signal (C) by the oscillating signal (D) from the first oscillator 206 to output a result (E). In FIGS. 13 and 15, when (C) is represented by $S(t) \cdot \sin(wt+\phi)$ and (D) is represented by $\sin(wt)$, the output (E) of the first multiplier 202 may be represented by $-S(t) \frac{1}{2}\{\cos(2wt+\phi)-\cos(\phi)\}$. The first LPF 210 removes the high frequency noise from the output (E) of the first multiplier 202 and supplies a DC component to the first integrator 214. In FIGS. 13 and 15, when (E) is represented by $-S(t)\frac{1}{2}\{\cos(2wt+\phi)-\cos(\phi)\}$, an output (F) of the first LPF 210 may be represented by $S(t) \frac{1}{2} \cos(\phi)$.

The first integrator 214 adds data of the real part (In-Phase, I) received from the first LPF 210 n times and supplies an addition result to the location and pen pressure decision unit 218. If the first integrator 214 adds the data (I) 1024 times, (G) may be represented by $\Sigma_{k=0}^{1023} I_k$ in FIGS. 13 and 15.

The second oscillator 208 inputs an oscillating signal, which has the same frequency as the resonance signal and a phase delayed from the resonance signal by 90°, to the second multiplier 204, so as to extract the imaginary part of the resonance signal. In FIGS. 13 and 15, when (C) is represented by $S(t) \cdot \sin(wt+\phi)$, an output of the second oscillator 208 may be represented by $\cos(wt)$. The second multiplier 204 detects an envelope of the imaginary part from the received resonance signal. The second multiplier 204 multiplies the received resonance signal (C) by the oscillating signal from the second oscillator 208 to get an output (K), $+S(t)\frac{1}{2}\{\sin(2wt+\phi)+\sin(\phi)\}$. The second LPF 212 removes the high frequency noise from the output (K) of the second multiplier 204 and supplies a DC component to the second integrator 216. An output of the second LPF 212 may be represented by $S(t)\frac{1}{2} \sin(\phi)$.

The second integrator 216 adds data of the imaginary part (Quadrature, Q) received from the second LPF 212 n times and supplies an addition result to the location and pen pressure decision unit 218. If the second integrator 216 adds the imaginary part data (I) 1024 times, (H) may be represented by $\Sigma_{k=0}^{1023} Q_k$ in FIGS. 13 and 15.

The location and pen pressure decision unit 218 calculates a root mean square (RMS) value of data input from the first and second integrators 214 and 216 and decides the magnitude and the resonant frequency of the resonance signal. The RMS value is calculated by $\sqrt{I_{sum}^2 + Q_{sum}^2}$, where Isum is the real part (In-phase) of the resonance signal accumulated by the first integrator 214, and Qsum is the imaginary part (Quadrature, Q) of the resonance signal accumulated by the second integrator 216.

The location and pen pressure decision unit 218 compares the magnitude of the resonance signal with a predetermined reference value and decides that the pen is positioned on the touch screen TSP when the magnitude of the resonance signal is greater than the predetermined reference value. At this time, the location and pen pressure decision unit 218 outputs location information of the pen PEN based on coordinates of the XY electrode, to which the resonant inductive signal is applied. Further, the location and pen pressure decision unit 218 calculates the pen pressure of the pen PEN based on the changes in the resonant frequency of the pen PEN and outputs the pen pressure information.

In FIGS. 13 and 15, (I) is the location and pen pressure information XY(PEN) of the pen PEN the location and pen pressure decision unit 218 outputs as the digital data.

The first and second oscillators 206 and 208 may be implemented as a digital pulse generator, for example, a numerically controlled oscillator (NCO) capable of changing an output frequency. The Tx driver 230 generates the resonant inductive signal through the same principle as the first and second oscillators 206 and 208 and may be implemented as the numerically controlled oscillator (NCO). Thus, the touch sensing system according to the embodiment of the invention can easily change the resonant frequency of the pen PEN. The frequency of the resonant inductive signal output from the Tx driver 230 may vary within a frequency range, which is set to a predetermined measuring range of the pen pressure, according to a predetermined rule. A specific frequency of the resonant inductive signal output from the Tx driver 230 is generated at predetermined time intervals because the frequency of the resonant inductive signal varies within the frequency range according to the predetermined rule.

The embodiment does not use the XY electrodes as the antenna. All of conductors each form a self inductance when an AC current is applied to them, and may radiate in electromagnetic field. However, because the XY electrodes according to the embodiment of the invention have very low antenna efficiency due to the problem of the resistance and the length when serving as the antenna in the same manner as related art finger touch electrodes, the XY electrodes are not used as the antenna. Because the XY electrodes are formed of the material, for example, ITO having a high resistance, the antenna efficiency of the XY electrodes is low.

In a dipole antenna, a frequency of a signal capable of being transmitted and received may vary depending on a length of the dipole antenna. When a wavelength, a transmission velocity, and a frequency of a signal are λ, c, and f, respectively, an equation of "λ=c/f" is given. According to the above equation, when a frequency of a received signal of the antenna decreases, a wavelength of the received signal increases. Thus, the XY electrodes do not serve as a resonant frequency receiving antenna of the pen in consideration of the length and the shape of the XY electrodes formed inside the touch screen TSP. In the touch sensing system according to the embodiment of the invention, the XY electrodes do not serve as the antenna and transmit the resonant inductive signal to the pen PEN through electric coupling in the electric field.

Figure 16:
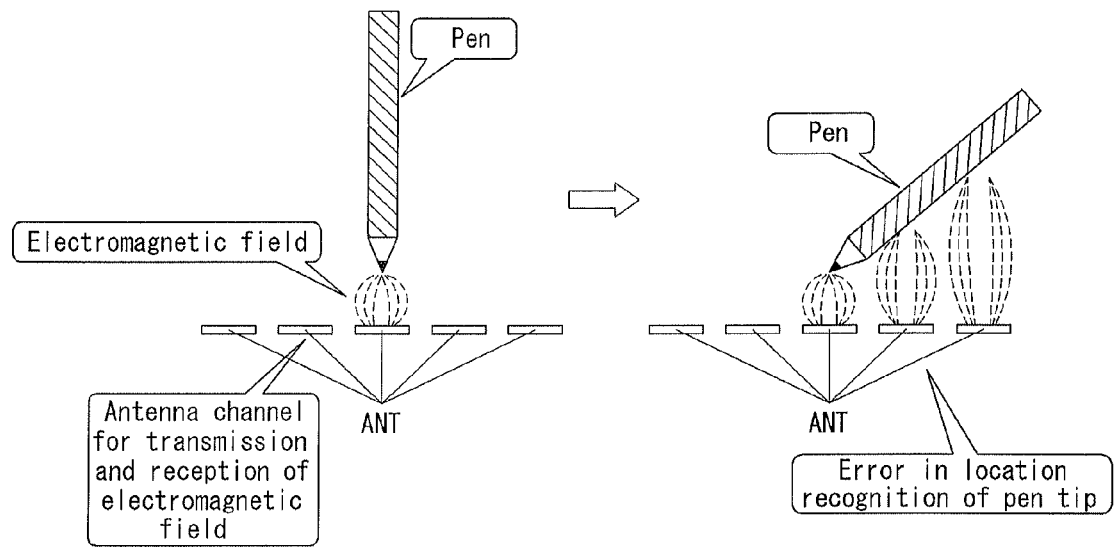
FIG. 16 illustrates an error in location recognition of a tip of a pen generated in a related art method for transmitting and receiving a resonance signal.
Figure 17:
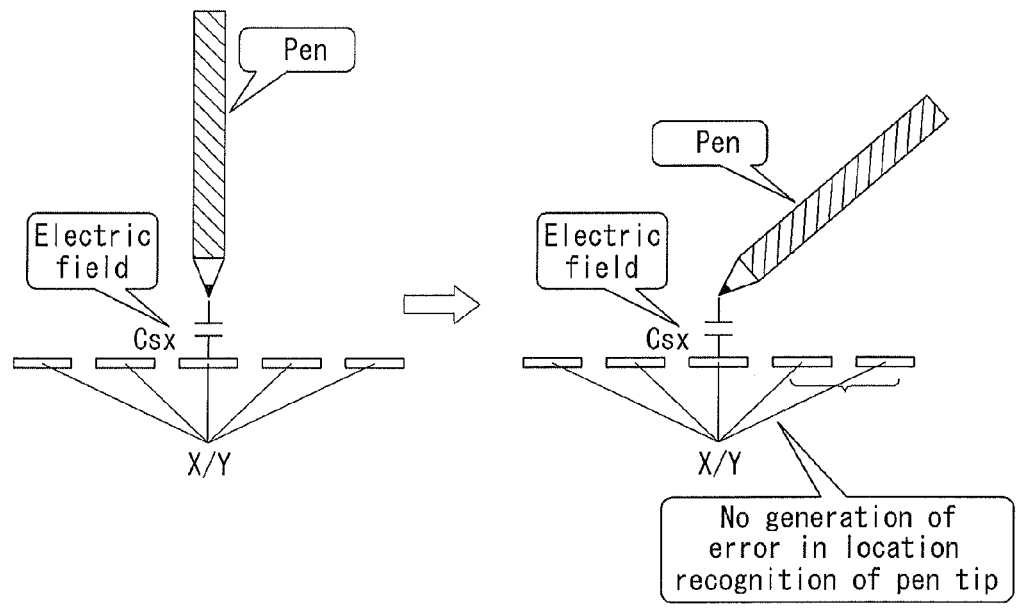
FIG. 17 illustrates an effect of an exemplary embodiment of the invention capable of preventing an error in location recognition of a pen tip.

If the transmitting and receiving method of the resonance signal through the antenna is used as in the related art, an error in detecting the location of the pen may be generated. The related art manufactures a pen tip positioned at an end of the pen as a nonconductor and mounts wires wound on a ferrite core near the pen tip. As shown in FIG. 16, when the pen is inclined, an inductor of the pen affects an antenna channel not touching the pen due to such a structure of the pen. Hence, it is difficult to accurately detect a location of the pen tip. On the other hand, as shown in FIG. 17, when the XY electrodes according to the embodiment of the invention are used, the resonant inductive signal is transmitted to the pen through the electric coupling in the electric field. Therefore, the embodiment may prevent the error in the location recognition of the pen tip generated in the related art.

Figure 18:
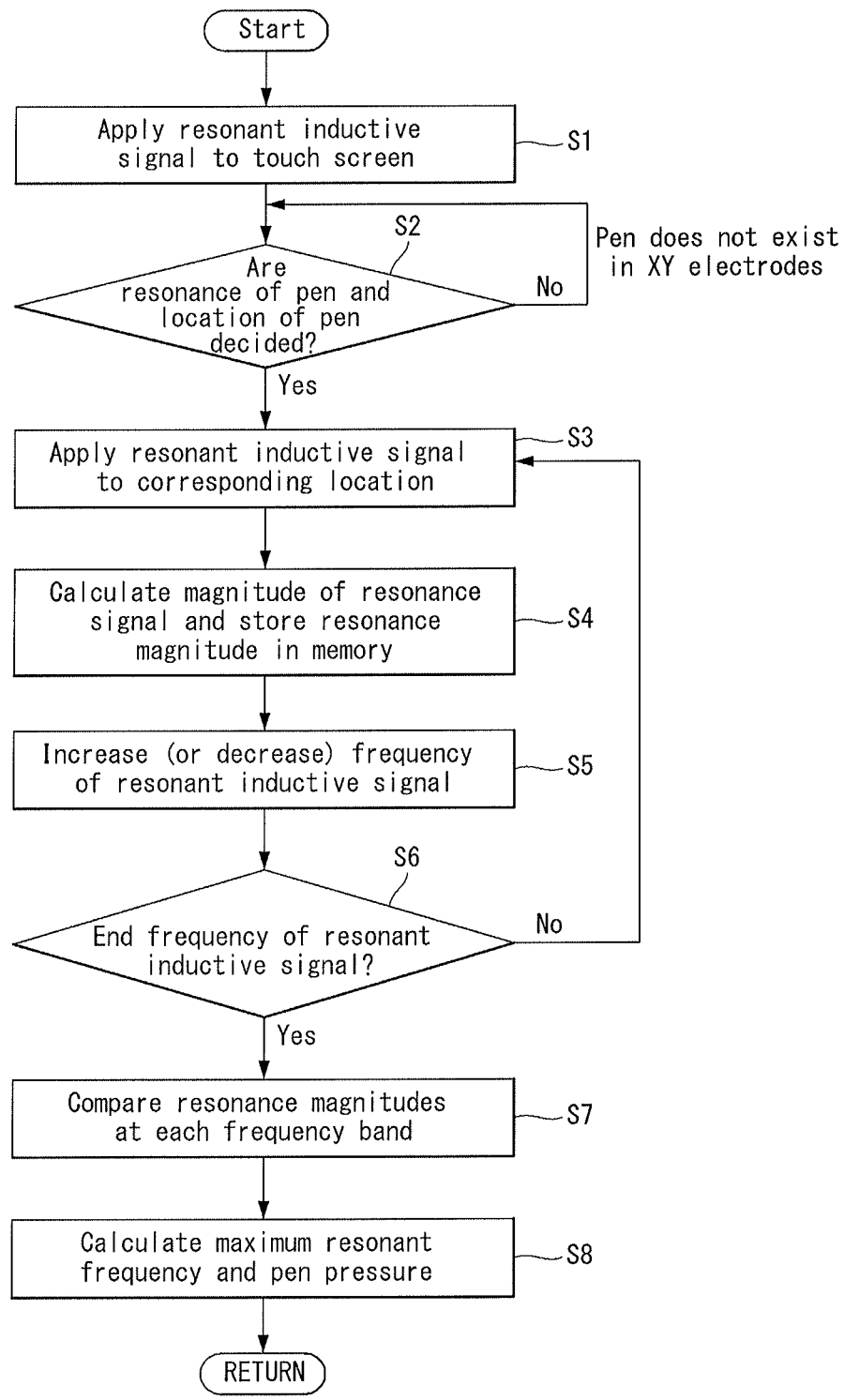
FIG. 18 is a flow chart showing a method for deciding a touch location and a pen pressure of a pen according to an exemplary embodiment of the invention.

FIG. 18 is a flow chart showing a method for deciding the touch location and the pen pressure of the pen according to the embodiment.

As shown in FIG. 18, when the resonant inductive signal is applied to the XY electrodes of the touch screen TSP, the resonant circuit of the pen PEN may generate the resonance signal in step S1. The location and pen pressure decision unit 218 decides the location of the pen PEN based on the magnitude of the resonance signal of the pen PEN received through the antenna ANT in step S2. An example of a method for deciding the location of the pen PEN is described later with reference to FIGS. 19 and 20.

Steps S3 to S8 are performed to detect the pen pressure of the pen PEN. First, the method applies the resonant inductive signal to the XY electrodes positioned under the pen PEN, calculates the magnitude of the resonance signal received through the antenna ANT, and stores the magnitude of the resonance signal in the memory 2 in steps S3 and S4. The method repeatedly performs steps S3 and S4 while changing a frequency of the resonant inductive signal and calculates the magnitude of the resonance signal of the pen PEN received through the antenna ANT at each frequency band in a frequency range capable of measuring the pen pressure in steps S5 and S6. When all of the calculations at the frequency bands are stored in the memory 2, the location and pen pressure decision unit 218 compares the magnitudes of the resonance signal at the frequency bands and calculates a maximum resonant frequency and the pen pressure in steps S7 and S8. An example of a method for deciding the pen pressure of the pen PEN is described later with reference to FIGS. 21 and 22.

Figure 19:
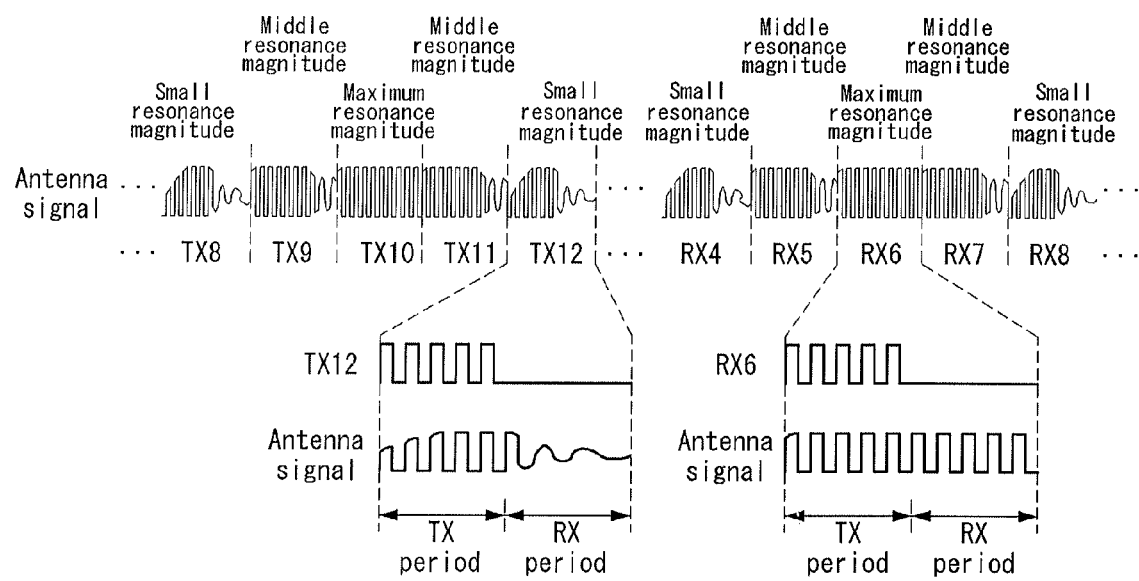
FIGS. 19 and 20 show an example of a method for deciding a touch location of a pen.
Figure 20:
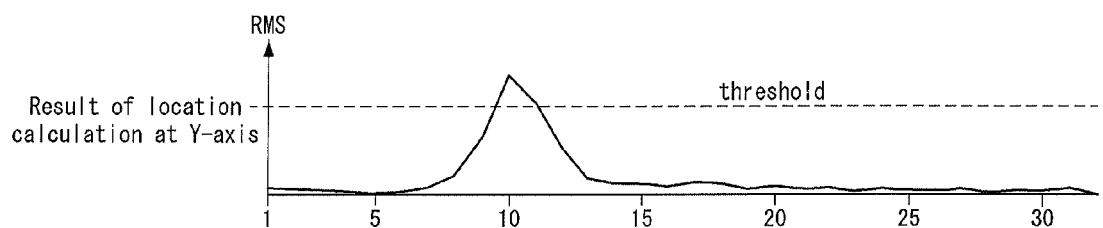
Figure 20:
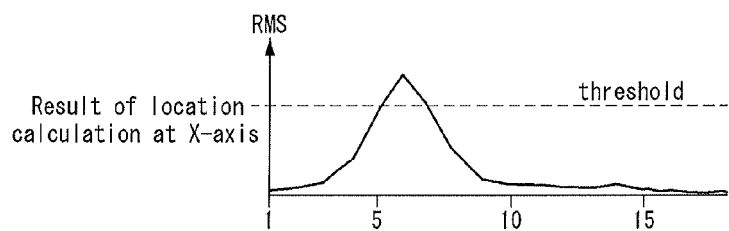

FIGS. 19 and 20 show an example of a method for deciding the touch location of the pen.

In FIG. 19, 'TX' denotes the Y electrode, and 'RX' denotes the X electrode. More specifically, FIG. 19 shows a partial waveform of an antenna receiving signal obtained when the resonant inductive signal is sequentially supplied to a total of (32×18) XY electrodes TX0 to TX31 and RX0 to RX17. When the pen does not approach the touch screen, a magnitude (i.e., an amplitude) of the resonance signal is measured as a small value in the same manner as an antenna signal in a sensing period of the Y electrode TX12. On the other hand, when the pen touches or approaches the touch screen, the magnitude of the resonance signal received through the antenna is measured as a large value in the same manner as the antenna signal in a sensing period of the X electrode RX6. Thus, the touch sensing system according to the embodiment of the invention receives the resonance signal through the antenna at each channel of the XY electrodes (or the TX and RX electrodes), calculates the RMS value, and calculates the magnitude of the resonance signal at each channel of the XY electrodes. The touch sensing system compares the magnitude of the resonance signal with a predetermined threshold value and decides that the pen is positioned on the touch screen when the magnitude of the resonance signal is greater than the predetermined threshold value.

FIG. 20 is a graph indicating the RMS value measured in each channel. More specifically, FIG. 20 shows an example where the pen touches a crossing of the Y electrode TX10 (or Y10) and the X electrode RX6 (or X6). The touch sensing system may accurately calculate coordinates of the pen through coordinates of the crossing of the Y electrode TX10 and the X electrode RX6.

Figure 21:
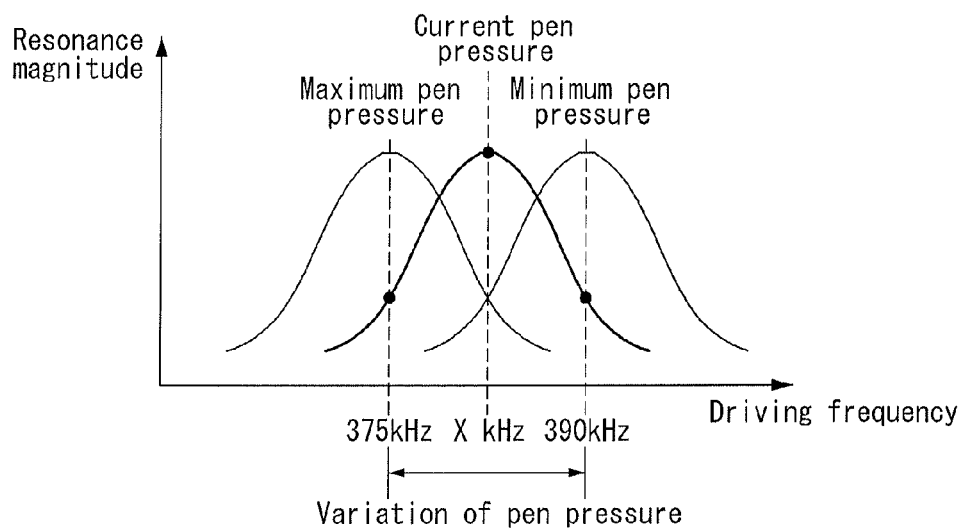
FIGS. 21 and 22 show an example of a method for deciding a pen pressure of a pen.
Figure 22:
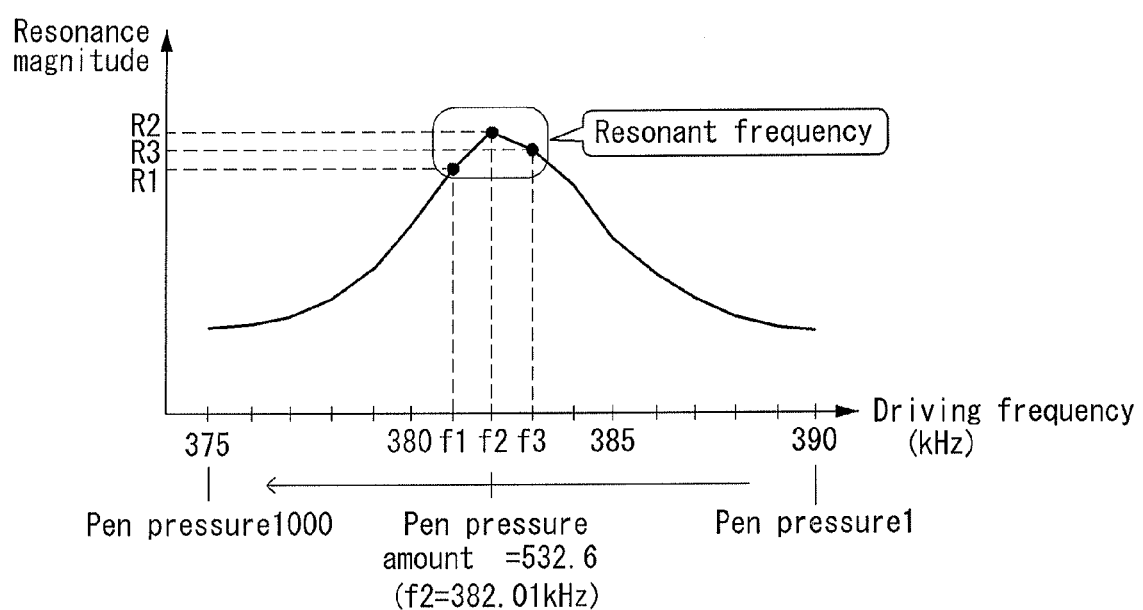

FIGS. 21 and 22 show an example of a method for deciding the pen pressure of the pen. The method is described on the assumption that the resonant frequency generated in the resonant circuit of the pen PEN varies depending on the pen pressure of the pen PEN.

As shown in FIG. 21, when the pen pressure of the pen PEN is measured as a minimum value, the resonant frequency of the pen PEN is about 390 kHz. Further, when the pen pressure of the pen PEN is measured as a maximum value, the resonant frequency of the pen PEN is about 375 kHz. The pen pressure of the pen PEN may be measured as a resonant frequency measured within a resonant frequency band of 375 kHz to 390 kHz. Thus, the embodiment of the invention measures a magnitude of a resonance signal received through the antenna ANT while changing a frequency band of the resonant inductive signal within the above resonant frequency band and measures a resonant frequency of the resonance signal having a maximum magnitude, so as to measure the pen pressure of the pen PEN when the pen PEN is positioned on the touch screen TSP. Hence, the embodiment of the invention may decide the pen pressure of the pen PEN.

FIG. 22 shows the result of measuring a resonance magnitude when the pen PEN applies a predetermined pressure to the touch screen TSP.

As shown in FIG. 22, a resonant frequency fo may be calculated using the formula of centre of gravity, and an amount P of the pen pressure of the of the pen PEN may be decided based on the resonant frequency fo.

$$f_0 = \frac{f1 R1 + f2 R2 + f3 R3}{R1 + R2 + R3} = \frac{(381 \times 300) + (382 \times 320) + (383 \times 310)}{300 + 320 + 310} = 382.011 \text{ kHz} \quad (1)$$

In the following equation (1), f2 is a resonant frequency of a resonance signal having a maximum magnitude, f1 and f3 are adjacent frequencies of the resonant frequency f2, and R1, R2, and R3 are the magnitudes of the resonance signal measured at the resonant frequency f2 and the adjacent frequencies f1 and f3.

$$P = \frac{f_{pmin} - f_{pcur}}{f_{pmin} - f_{pmax}} \times P_s = \frac{390 - 382.011}{390 - 375} \times 1000 = 532.6 \quad (2)$$

In the following equation (2), 'fpmin' is the resonant frequency when the pen pressure has a minimum value within a pen pressure scale (Ps=1000), 'fmax' is the resonant frequency when the pen pressure has a maximum value within the pen pressure scale (Ps=1000), and 'fcur' is the resonant frequency of the pen pressure to be currently measured.

The embodiment of the invention is not limited to FIGS. 21 and 22 showing only one example of the method for measuring the pen pressure. For example, the resonant frequency may increase in proportion to the pen pressure. Further, the above equation uses the three adjacent frequencies of the resonant frequency, but the embodiment of the invention is not limited thereto.

Figure 23:
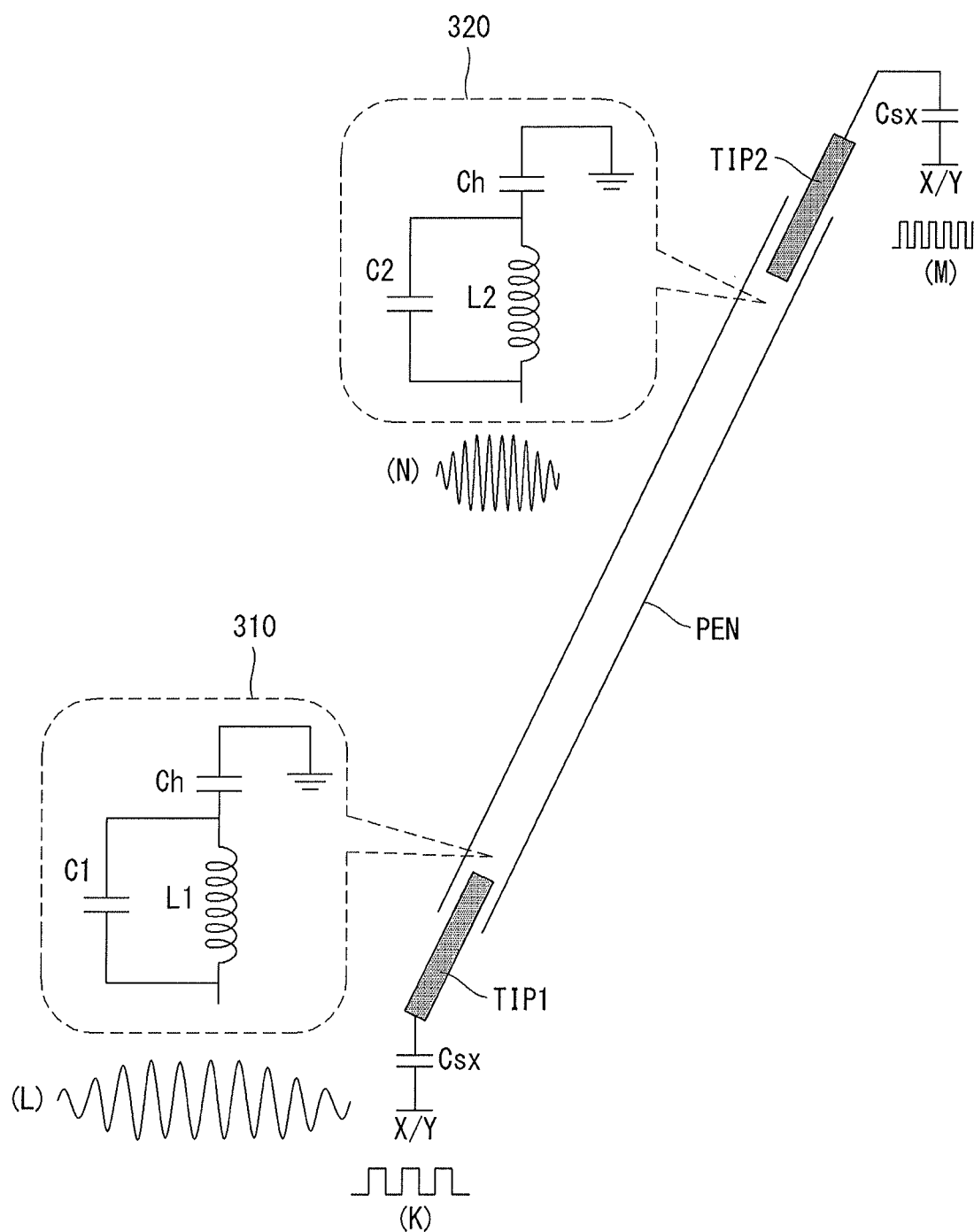
FIG. 23 shows a pen according to an exemplary embodiment of the invention.

One or more resonant circuits may be embedded in the pen PEN according to the embodiment of the invention. For example, the embodiment of the invention may install one resonant circuit to the pen PEN as shown in FIG. 3, or may install the plurality of resonant circuits to the pen PEN as shown in FIG. 23 so as to perform additional function. In this instance, the resonant circuits are connected to different parts of the pen PEN, and a method for deciding locations and pen pressures of the different parts of the pen PEN is substantially the same as the above-described method.

FIG. 23 shows the pen PEN according to the embodiment.

Figure 24:
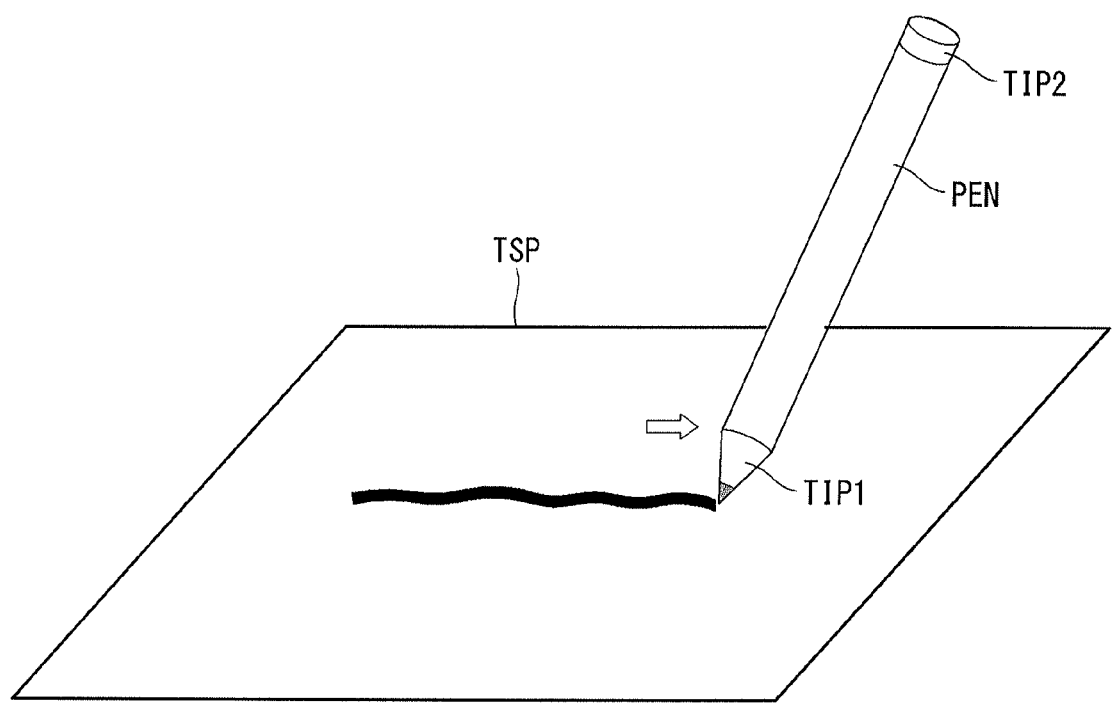
FIGS. 24 to 26 show an application method using a pen shown in FIG. 23.
Figure 25:
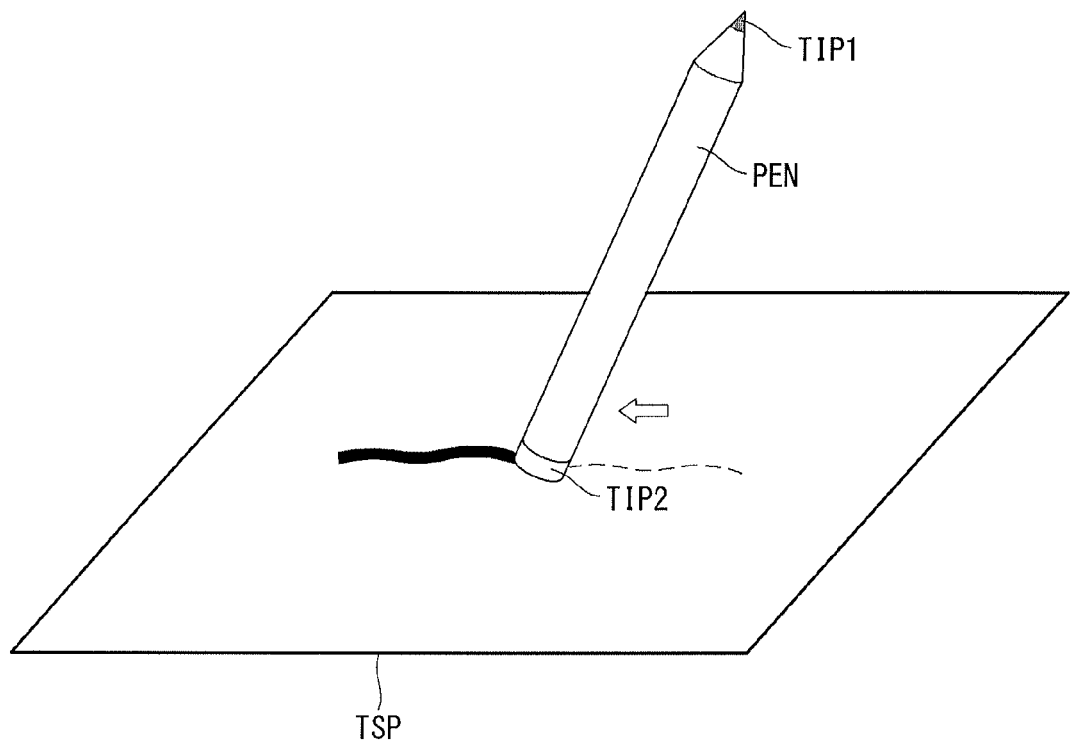
Figure 26:
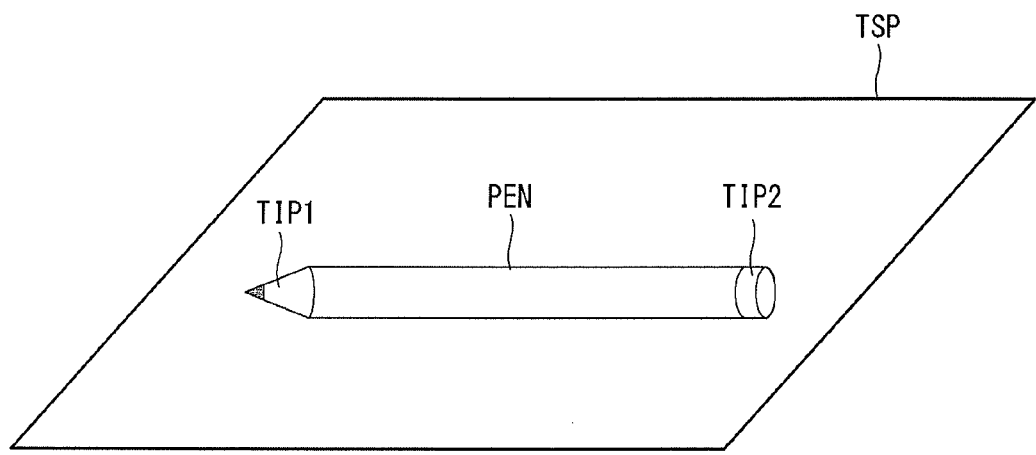

FIGS. 24 to 26 show an application method using the pen PEN shown in FIG. 23.

As shown in FIG. 23, a first tip TIP1 is formed at one end of the pen PEN, and a second tip TIP2 is formed at the other end of the pen PEN. The pen PEN includes first and second resonant circuits 310 and 320. Each of the first and second resonant circuits 310 and 320 may be implemented as an LC parallel resonant circuit.

The first resonant circuit 310 includes a first inductor L1 and a first capacitor C1 which are connected in parallel. An inductance of the first inductor L1 is connected to the first tip TIP1 and may vary depending on a pressure of the first tip TIP1. The second resonant circuit 320 includes a second inductor L2 and a second capacitor C2 which are connected in parallel. An inductance of the second inductor L2 is connected to the second tip TIP2 and may vary depending on a pressure of the second tip TIP2. The first resonant circuit 310 and the second resonant circuit 320 have different LC values. Thus, the first resonant circuit 310 and the second resonant circuit 320 have different resonant frequency bands.

Figure 27:
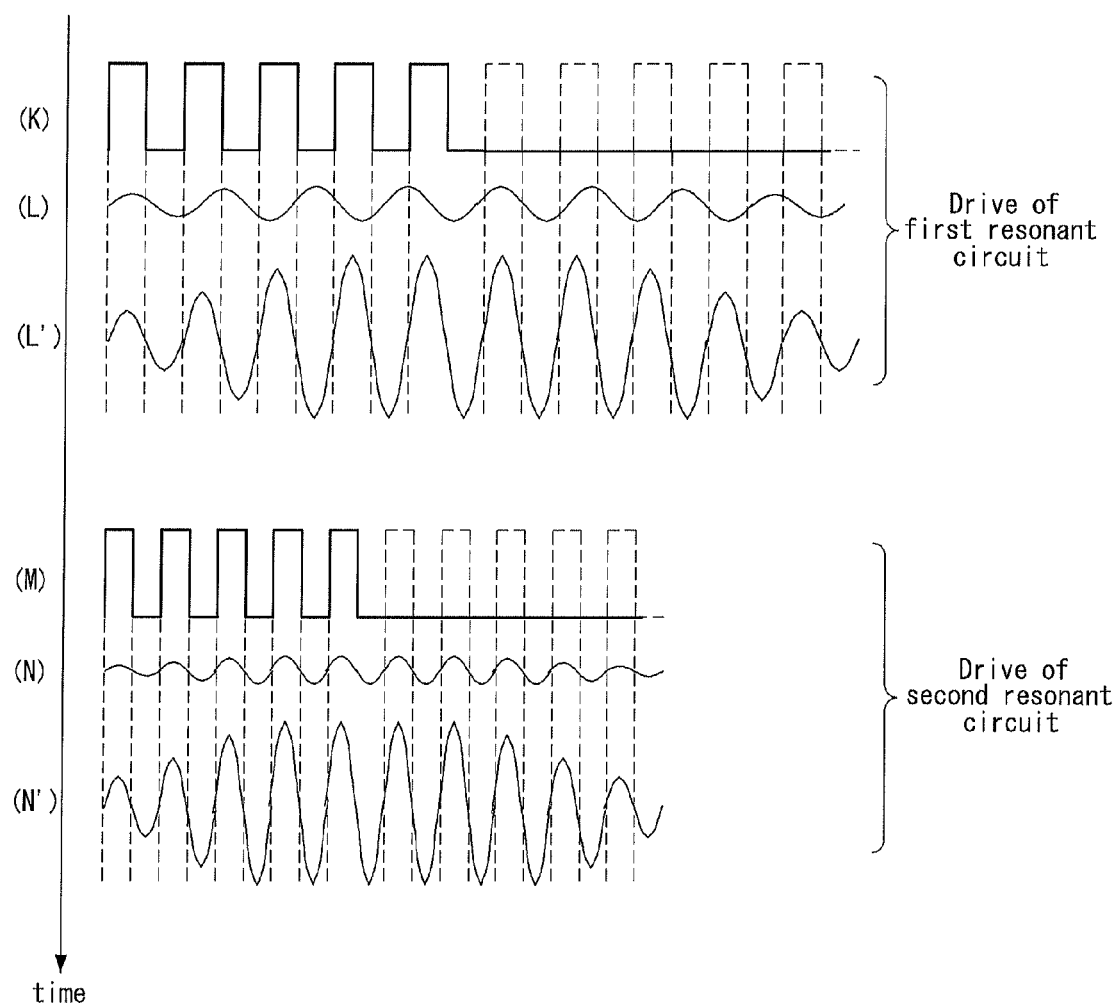
FIG. 27 is a waveform diagram showing a resonant inductive signal of a pen shown in FIG. 23 and a resonance signal received through an antenna.

As shown in FIG. 27, the first touch driving circuit 30 alternately applies a first resonant inductive signal (K) for inducing a resonance of the first resonant circuit 310 and a second resonant inductive signal (M) for inducing a resonance of the second resonant circuit 320 to the XY electrodes.

The first resonant inductive signal (K) has a first frequency band including a resonant frequency of the first resonant circuit 310 and an adjacent frequency of the resonant frequency, so as to measure the pen pressure. The second resonant inductive signal (M) has a second frequency band including a resonant frequency of the second resonant circuit 320 and an adjacent frequency of the resonant frequency, so as to measure the pen pressure. Thus, the first touch driving circuit 30 measures a location and a pen pressure of the first tip TIP1 in the first frequency band and measures a location and a pen pressure of the second tip TIP2 in the second frequency band. In FIGS. 23 and 27, (L) is a first resonance signal which is generated from the first resonant circuit 310 in response to the first resonant inductive signal (K) and is received by the antenna ANT. (L') is an amplification signal of the first resonance signal (L). Further, (N) is a second resonance signal which is generated from the second resonant circuit 320 in response to the second resonant inductive signal (M) and is received by the antenna ANT. (N') is an amplification signal of the second resonance signal (N).

The first touch driving circuit 30 measures locations of the first and second tips TIP1 and TIP2 based on the magnitude of the resonance signal received through the antenna ANT. The first touch driving circuit 30 measures a pen pressure of the first tip TIP1 based on a first resonant frequency output from the first resonant circuit 310 and adjacent frequencies of the first resonant frequency while varying a frequency of the first resonant inductive signal (K). The first touch driving circuit 30 measures a pen pressure of the second tip TIP2 based on a second resonant frequency output from the second resonant circuit 320 and adjacent frequencies of the second resonant frequency while varying a frequency of the second resonant inductive signal (M).

The host system 40 may give a different function to each tip of the pen PEN using an application program. As shown in FIG. 24, when the first tip TIP1 is recognized on the touch screen TSP, the host system 40 may produce an image, which is drawn along a trace of the first tip TIP1. On the contrary, as shown in FIG. 25, when the second tip TIP2 is recognized on the touch screen TSP, the application program may delete an image along a trace of the second tip TIP2. Further, as shown in FIG. 26, when both the first and second tips TIP1 and TIP2 are recognized on the touch screen TSP, the host system 40 may color an image in a previously determined color. Thus, the host system 40 may give the different function to each tip of the pen PEN and may give a third function to the pen PEN when the tips of the pen PEN are recognized together, thereby expanding a touch application range of the pen PEN.

Figure 28:
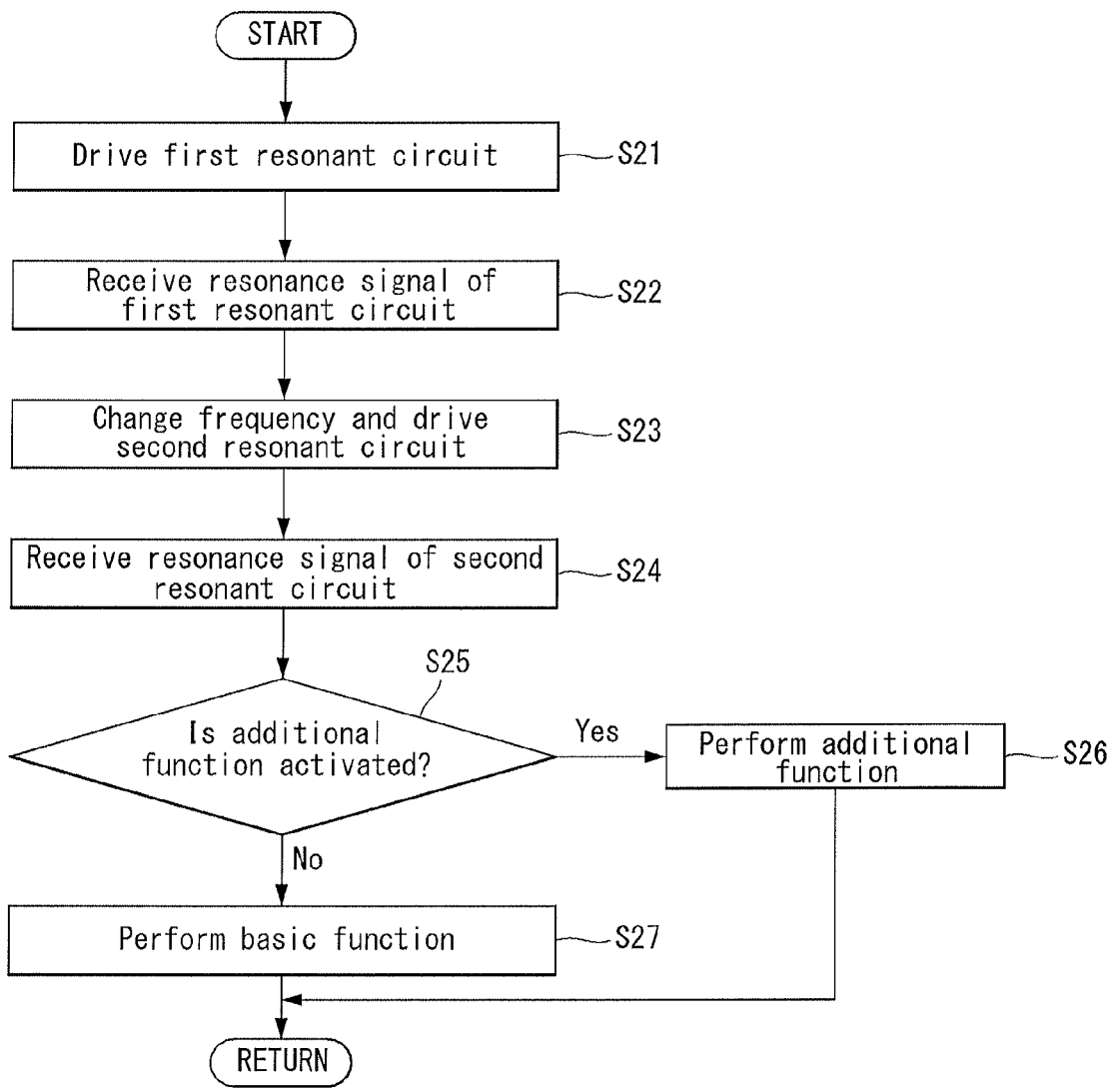
FIG. 28 is a flow chart showing a method for driving a pen shown in FIG. 23.

FIG. 28 is a flow chart showing a method for driving a pen shown in FIG. 23.

As shown in FIG. 28, the first touch driving circuit 30 generates the first resonant inductive signal for inducing a resonance of the first resonant circuit 310.

As shown in FIG. 28, the first touch driving circuit 30 alternately applies the first resonant inductive signal for driving the first resonant circuit 310 and the second resonant inductive signal for driving the second resonant circuit 320 to the XY electrodes. Thus, the first and second resonant inductive signals are supplied to the XY electrodes in the time-division manner.

The first resonant circuit 310 generates a resonance signal of a first frequency band in response to the first resonant inductive signal applied through the capacitance Csx, and the resonance signal is received by the first touch driving circuit 30 through the antenna ANT in steps S21 and S22. The second resonant circuit 320 generates a resonance signal of a second frequency band in response to the second resonant inductive signal applied through the capacitance Csx, and the resonance signal is received by the first touch driving circuit 30 through the antenna ANT in steps S23 and S24.

The first touch driving circuit 30 measures locations of the first and second tips TIP1 and TIP2 based on a resonance magnitude of a resonance signal received through the antenna ANT and measures pen pressures of the first and second tips TIP1 and TIP2 based on a resonant frequency. The host system 40 decides whether or not the pen PEN is sensed based on the location and pen pressure information XY(PEN) of the pen PEN received from the first touch driving circuit 30 and activates the additional function depending on the sensed tip. For example, the host system 40 may perform a basic function (or a first function), such as the drawing, when the first tip TIP1 is sensed, and may perform an additional function, such as a delete function, a coloring function, etc., when the second tip TIP2 is sensed in steps S25 to S27.

As described above, the embodiment applies the AC signal for inducing the resonance of the pen to the existing finger touch electrodes, transmits the AC signal to the pen through the electric coupling, and receives the resonance signal of the pen through the antenna. As a result, because the embodiment of the invention does not form the plurality of loop antennas of the touch sensing system on the substrate of the display panel, the embodiment of the invention can simplify the structure of the substrate of the display panel and can slim the display panel.

The loop antenna serves as the antenna only when a distance between the antennas is secured. On the other hand, the existing finger touch electrodes are formed in the shape of a conductive rod. Thus, the number of finger touch electrodes may be more than the number of loop antennas in the same area. As a result, the embodiment of the invention may minutely divide the sensing point capable of recognizing the touch input of the pen.

Because the embodiment of the invention processes the digital resonance signal, the embodiment of the invention does not require an analog comparator.

The embodiment does not use a related art waveform generator, in which an operating frequency is limited, and uses the digital pulse generator, in which there is no limit to changes in an operational frequency. Thus, the embodiment is advantageous to changes in the resonant frequency of the pen.

Because the embodiment minimizes the analog circuit in the circuit receiving the resonance signal of the pen, the embodiment of the invention is less affected by a surrounding environment than the related art.

Because the embodiment implements most of the circuits receiving the resonance signal of the pen as the digital signal processing circuit, the touch driving circuit may be implemented as one chip IC.

Because the embodiment embeds the microprocessor in the touch driving circuit, the embodiment of the invention can change the operational characteristic of the touch driving circuit and can easily implement the performance improvement algorithm of the touch driving circuit.

The embodiment does not measure the phase of the resonance signal, decides the location of the pen based on the resonance magnitude, and decides the pen pressure of the pen based on the resonant frequency. Thus, the embodiment may minimize the circuit for deciding the location and the pen pressure of the pen and may reduce the power consumption.

Because the related art detects the pen pressure of the pen based on the resonance signal of the pen and the phase of the resonant inductive signal applied to the pen, the related art is greatly affected by the parasitic capacitance or the parasitic inductance. On the other hand, the embodiment measures the pen pressure of the pen based on the resonance magnitude at each frequency of the resonant frequency band. Therefore, the embodiment is hardly affected by the parasitic capacitance or the parasitic inductance and can measure stably and accurately the pen pressure.

The embodiment can easily measure the pen pressure of the pen through the simple algorithm without a limit resulting from a nonlinear period of the arctangent characteristic.

The embodiment embeds the plurality of resonant circuits each having a different resonant frequency in the pen, so as to independently distinguish different parts of the pen. As a result, the embodiment of the invention may implement user experience (UX), in which the user can intuitionally switch functions of the pen, without installing a separate switch for the function switching to the pen.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing system comprising:
a pen including at least one resonant circuit embedded therein;
a touch panel including X electrodes and Y electrodes perpendicular to the X electrodes;
an antenna that surrounds the X and the Y electrodes; and
a first touch driving circuit configured to supply a resonant inductive signal to the X and the Y electrodes, decide a location of the pen with respect to the touch panel based on a resonance magnitude of a resonance signal received through the antenna, and decide a pen pressure of the pen on the touch panel based on a resonant frequency of the resonant circuit and an adjacent frequency of the resonant frequency measured while varying a frequency of the resonant inductive signal.

2. The touch sensing system of claim 1, wherein the first touch driving circuit transmits the resonant inductive signal to the pen through electric coupling and allows the resonance signal of the pen to be received by the antenna through an electromagnetic resonance path.

3. The touch sensing system of claim 1, wherein a resonant frequency fo of the pen and an amount P of the pen pressure of the pen are calculated by the following equations:

$$f_0 = \frac{f1R1 + f2R2 + f3R3}{R1 + R2 + R3}$$

where f2 is a resonant frequency of the resonance signal having a maximum magnitude, f1 and f3 are adjacent frequencies of the resonant frequency f2, and R1, R2, and R3 are magnitudes of the resonance signal measured at the resonant frequency f2 and the adjacent frequencies f1 and f3, $$P = \frac{f_{pmin} - f_{pcur}}{f_{pmin} - f_{pmax}} \times P_s$$

where 'fpmin' is the resonant frequency when the pen pressure has a minimum value within a pen pressure scale 'fmax' is the resonant frequency when the pen pressure has a maximum value within the pen pressure scale and 'fcur' is the resonant frequency of the pen pressure to be currently measured and Ps is a predetermined constant.

4. The touch sensing system of claim 1, wherein the resonant circuit includes a first resonant circuit connected to a first tip and a second resonant circuit connected to a second tip,
wherein a resonant frequency band of the first resonant circuit is different from a resonant frequency band of the second resonant circuit.

5. The touch sensing system of claim 4, wherein the first touch driving circuit alternately supplies a first resonant inductive signal for driving the first resonant circuit and a second resonant inductive signal for driving the second resonant circuit to the X and the Y electrodes.

6. The touch sensing system of claim 5, wherein the first touch driving circuit determines locations of the first and second tips based on the resonance magnitude of the resonance signal received through the antenna,
wherein the first touch driving circuit decides a pen pressure of the first tip based on a first resonant frequency output from the first resonant circuit and an adjacent frequency of the first resonant frequency while varying a frequency of the first resonant inductive signal,
wherein the first touch driving circuit decides a pen pressure of the second tip based on a second resonant frequency output from the second resonant circuit and an adjacent frequency of the second resonant frequency while varying a frequency of the second resonant inductive signal.

7. The touch sensing system of claim 1, further comprising a second touch driving circuit configured to supply a stimulus signal to the Y electrodes and receive charges through the X electrodes in synchronization with the stimulus signal.

8. The touch sensing system of claim 1, further comprising a second touch driving circuit configured to supply a stimulus signal to the X electrodes and the Y electrodes and receive charges through the X electrodes and the Y electrodes in synchronization with the stimulus signal.

9. The touch sensing system of claim 1, wherein the antenna comprises a single antenna surrounding the X and the Y electrodes.

10. The touch sensing system of claim 9, wherein the first touch driving circuit includes:
an analog signal processing unit configured to amplify an analog resonance signal received through the antenna, extract a frequency band of the resonance signal of the pen, and output a digital resonance signal;
a Tx driver configured to generate the resonant inductive signal of the pen and sequentially supply the resonant inductive signal to the X and the Y electrodes;
a digital demodulator configured to extract a real part and an imaginary part from the digital resonance signal of the pen and output a result of accumulating each of the real part and the imaginary part n times, where n is a positive integer equal to or greater than 2; and
a location and pen pressure decision unit configured to calculate a root mean square (RMS) value of data input from the digital demodulator and decide a magnitude and a resonant frequency of the resonance signal.

11. The touch sensing system of claim 10, wherein the analog signal processing unit includes:
an amplifier configured to amplify the analog resonance signal received through the antenna;
a band pass filter configured to cut off a frequency band excluding a resonant frequency of the pen from an output of the amplifier; and
an analog-to-digital converter configured to convert an output of the band pass filter into the digital resonance signal.

12. The touch sensing system of claim 11, wherein the digital demodulator includes:
a first oscillator configured to output a first oscillating signal, of which a frequency and a phase are the same as the resonance signal of the pen received through the antenna;
a first multiplier configured to multiply the first oscillating signal by the resonance signal of the pen received through the antenna and output a multiplication result;
a first low pass filter configured to remove a high frequency noise from an output of the first multiplier;
a first integrator configured to add data input from the first low pass filter n times and supply an addition result to the location and pen pressure decision unit;
a second oscillator configured to output a second oscillating signal, which has the same frequency as the resonance signal of the pen received through the antenna and a phase delayed from the resonance signal by 90°;
a second multiplier configured to multiply the second oscillating signal by the resonance signal of the pen received through the antenna and output a multiplication result;
a second low pass filter configured to remove a high frequency noise from an output of the second multiplier; and
a second integrator configured to add data input from the second low pass filter n times and supply an addition result to the location and pen pressure decision unit.

13. The touch sensing system of claim 1, wherein the pen operates independent of separate electric power.

14. The touch sensing system of claim 13, wherein the resonant circuit of the pen includes an inductor and a capacitor,
wherein the inductor includes a first coil wound on a ferrite core, a second coil wound on a guide core, and a spring positioned between the ferrite core and the guide core,
wherein the first and second coils are connected in series to each other.

15. A method for driving a touch sensing system including a pen including at least one resonant circuit embedded therein, a touch panel including X electrodes and Y electrodes perpendicular to the X electrodes, and an antenna surrounding the X and the Y electrodes, the method comprising:
deciding a location of the pen with respect to the touch panel based on a resonance magnitude of a resonance signal received through the antenna; and
deciding a pen pressure of the pen on the touch panel based on a resonant frequency of the resonant circuit and an adjacent frequency of the resonant frequency measured while varying a frequency of a resonant inductive signal.

16. The method of claim 15, further comprising:
transmitting the resonant inductive signal to the pen through electric coupling; and
allowing a resonance signal of the pen to be received by the antenna through an electromagnetic resonance path.

17. The method of claim 15, wherein a resonant frequency fo of the pen and an amount P of the pen pressure of the pen are calculated by the following equations:

$$f_0 = \frac{f1R1 + f2R2 + f3R3}{R1 + R2 + R3}$$

where f2 is a resonant frequency of a resonance signal having a maximum magnitude, f1 and f3 are adjacent frequencies of the resonant frequency f2, and R1, R2, and R3 are magnitudes of the resonance signal measured at the resonant frequency f2 and the adjacent frequencies f1 and f3, $$P = \frac{f_{pmin} - f_{pcur}}{f_{pmin} - f_{pmax}} \times P_s$$

where 'fpmin' is the resonant frequency when the pen pressure has a minimum value within a pen pressure scale, 'fmax' is the resonant frequency when the pen pressure has a maximum value within the pen pressure scale, 'fcur' is the resonant frequency of the pen pressure to be currently measured and Ps is a predetermined constant.

18. A user interface comprising:
a display;
a touch sensing system comprising:
a pen including a resonant circuit embedded therein;
a touch panel including X electrodes and Y electrodes perpendicular to the X electrodes;
an antenna that surrounds the X and the Y electrodes; and
a first touch driving circuit configured to supply a resonant inductive signal to the X and the Y electrodes, decide a location of the pen with respect to the touch panel based on a resonance magnitude of a resonance signal received through the antenna, and decide a pen pressure of the pen on the touch panel based on a resonant frequency of the resonant circuit and an adjacent frequency of the resonant frequency measured while varying a frequency of the resonant inductive signal;
a processor and memory configured to analyze a received signal of the antenna to estimate a location and a pen pressure of the pen on the display.

* * * * *